US008140699B2

(12) United States Patent
Pickens et al.

(10) Patent No.: US 8,140,699 B2
(45) Date of Patent: Mar. 20, 2012

(54) SWITCHING A CLIENT FROM UNICASTING TO MULTICASTING BY SIMULTANEOUSLY PROVIDING UNICAST AND MULTICAST STREAMS TO THE CLIENT

(75) Inventors: John Pickens, Newark, CA (US); Kirk Blattman, San Ramon, CA (US); Glenn Connery, Petaluma, CA (US); Andrew Palfreyman, San Jose, CA (US); W. Paul Sherer, Danville, CA (US)

(73) Assignee: Cisco Technology, Inc., San Jose, CA (US)

( * ) Notice: Subject to any disclaimer, the term of this patent is extended or adjusted under 35 U.S.C. 154(b) by 1029 days.

(21) Appl. No.: 11/361,303

(22) Filed: Feb. 23, 2006

(65) Prior Publication Data

US 2006/0200576 A1   Sep. 7, 2006

Related U.S. Application Data

(60) Provisional application No. 60/655,328, filed on Feb. 23, 2005, provisional application No. 60/719,146, filed on Sep. 21, 2005.

(51) Int. Cl.
G06F 15/16   (2006.01)

(52) U.S. Cl. .......................... 709/231; 725/105; 370/352

(58) Field of Classification Search .................... 709/231
See application file for complete search history.

(56) References Cited

U.S. PATENT DOCUMENTS

| | | | |
|---|---|---|---|
| 5,892,767 A | 4/1999 | Bell et al. | |
| 6,314,466 B1 | 11/2001 | Agarwal et al. | |
| 6,339,785 B1 | 1/2002 | Feigenbaum | |
| 6,493,876 B1 | 12/2002 | DeFreese et al. | |
| 6,535,909 B1 | 3/2003 | Rust | |
| 6,651,105 B1 | 11/2003 | Bhagwat et al. | |
| 6,691,312 B1 | 2/2004 | Sen et al. | |
| 6,711,741 B2 | 3/2004 | Yeo | |
| 6,731,625 B1 | 5/2004 | Eastes et al. | |
| 6,845,398 B1 | 1/2005 | Galensky et al. | |
| 6,973,667 B2 * | 12/2005 | Fritsch | 725/88 |
| 7,107,351 B2 | 9/2006 | Baumeister et al. | |

(Continued)

FOREIGN PATENT DOCUMENTS

WO   0249359 A1   6/2002

OTHER PUBLICATIONS

Non-Final Office Action for U.S. Appl. No. 11/360,078, 33 pages (May 27, 2009).

(Continued)

*Primary Examiner* — Patrice Winder
*Assistant Examiner* — Tauqir Hussain
(74) *Attorney, Agent, or Firm* — Merchant & Gould

(57) ABSTRACT

Switching a client from unicasting back to multicasting involves simultaneously providing the digital video content to the client via unicasting and multicasting until the client has buffered duplicate frames (i.e., frames that contain the same digital video content). Once the client has buffered duplicate frames, the client can transition from playing out of a buffer that holds frames received via unicasting to playing out of a buffer that holds frames received via multicasting without skipping a frame. Once the transition back to multicasting is complete, unicasting is terminated and any frames remaining in the unicast buffer are flushed.

20 Claims, 14 Drawing Sheets

U.S. PATENT DOCUMENTS

| | | | |
|---|---|---|---|
| 7,523,482 B2 * | 4/2009 | Barrett et al. | 725/120 |
| 7,549,160 B1 * | 6/2009 | Podar et al. | 726/4 |
| 2002/0114465 A1 * | 8/2002 | Shen-Orr et al. | 380/231 |
| 2002/0126755 A1 | 9/2002 | Li et al. | |
| 2003/0074667 A1 | 4/2003 | Cheung et al. | |
| 2003/0093802 A1 | 5/2003 | Cho et al. | |
| 2003/0093803 A1 | 5/2003 | Ishikawa et al. | |
| 2004/0045036 A1 * | 3/2004 | Terasaki | 725/116 |
| 2005/0008240 A1 | 1/2005 | Banerji et al. | |
| 2005/0081244 A1 * | 4/2005 | Barrett et al. | 725/97 |
| 2005/0226272 A1 | 10/2005 | Luby et al. | |
| 2005/0257106 A1 | 11/2005 | Luby et al. | |
| 2006/0029065 A1 | 2/2006 | Fellman | |
| 2006/0159117 A1 * | 7/2006 | Furlong et al. | 370/432 |
| 2006/0187950 A1 * | 8/2006 | Bou-Diab et al. | 370/432 |
| 2006/0215593 A1 * | 9/2006 | Wang et al. | 370/315 |
| 2006/0279437 A1 | 12/2006 | Luby et al. | |
| 2007/0157221 A1 * | 7/2007 | Ou et al. | 725/10 |
| 2008/0141097 A1 * | 6/2008 | Vayanos et al. | 714/755 |
| 2008/0151805 A1 * | 6/2008 | Vayanos et al. | 370/312 |
| 2008/0205640 A1 * | 8/2008 | Shen-Orr et al. | 380/35 |
| 2009/0064242 A1 * | 3/2009 | Cohen et al. | 725/90 |
| 2009/0100473 A1 * | 4/2009 | Segel | 725/60 |

OTHER PUBLICATIONS

Non-Final Office Action for U.S. Appl. No. 11/360,080, 16 pages (May 26, 2009).

International Search Report for International Application No. PCT/US2006/006446, 3 pages (Apr. 10, 2007).

Written Opinion of the International Search Authority for International Application No. PCT/US2006/006446, 3 pages (Apr. 10, 2007).

Non-Final Office Action for U.S. Appl. No. 11/673,484, 12 pages (Apr. 19, 2009).

International Search Report for International Application No. PCT/US2007/061957, 3 pages (Feb. 14, 2008).

Written Opinion of the International Search Authority for International Application No. PCT/US2007/061957, 4 pages (Feb. 14, 2008).

* cited by examiner

SWITCHING A CLIENT FROM UNICASTING TO MULTICASTING BY SIMULTANEOUSLY PROVIDING UNICAST AND MULTICAST STREAMS TO THE CLIENT

CROSS-REFERENCE TO RELATED APPLICATIONS

This application is entitled to the benefit of provisional U.S. Patent Application Ser. No. 60/655,328, filed Feb. 23, 2005 and provisional U.S. Patent Application Ser. No. 60/719,146, filed Sep. 21, 2005, the disclosure of which is incorporated by reference herein in its entirety.

This application is related to the co-filed applications entitled "SWITCHING A CLIENT FROM UNICASTING TO MULTICASTING BY INCREASING THE UNICAST STREAM RATE TO THE CLIENT" having application Ser. No. 11/360,080, filed Feb. 23, 2006 and "FAST CHANNEL CHANGE WITH CONDITIONAL RETURN TO MULTICASTING" having application Ser. No. 11/360,078, filed Feb. 23, 2006.

FIELD OF THE INVENTION

The invention relates generally to digital video networks, and more particularly, to techniques for fast channel change in digital video networks that are capable of distributing digital video content via multicasting and unicasting.

BACKGROUND OF THE INVENTION

The viewer experience with delivery of digital video content via broadcast channels is often poor. Because of the characteristics of compressed video encoding, the viewer often waits seconds after selection of a broadcast channel until the digital video content is finally displayed. Because viewers are accustomed to near instantaneous channel change functionality with analog television, the quality of the digital television experience often times does not meet viewer expectations.

The root of the slow channel change problem has to do with the framing of compressed video (e.g., MPEG2 or MPEG4/H.264). In order to minimize bandwidth, the majority of the frames contained within a compressed stream of digital video content are P-frames and B-frames, which are frames that encode changes to a displayed image. An I-frame (MPEG2) on the other hand is a frame that presents a complete new image. The rate at which I-frames (or equivalent I-slice constructs in MPEG4) are delivered in a digital video stream is typically one I-frame every ¼ to 2 seconds, depending on the amount of motion contained within the stream. The delay after requesting a channel change is dominated by having to wait until the next I-frame finally arrives, which can be up to 2 seconds, before the new channel can be displayed.

In an Internet Protocol (IP) television environment, different channels of digital video content are distributed to multiple clients via IP multicasting. One technique for implementing a fast channel change in an IP television environment is described in U.S. Pat. Publ. No. 2005/0081244 to Barret et al. The technique described by Barret et al. involves servicing a channel change request by 1) retaining an I-frame from each different broadcast stream, and then 2) transmitting the retained I-frame for the requested channel to the corresponding client via a unicast message instead of via a multicast message. The I-frame is then used to quickly display the requested channel. Once the retained I-frame is sent to the client via the unicast message, the client is rapidly joined to the multicast group corresponding to the requested channel in time for the client to receive the next I-frame via multicasting. In IP television environments, internet group management protocol (IGMP) is typically used to join clients to multicast groups. While transmitting an I-frame via a unicast message works well to achieve a fast channel change, using IGMP to join a client to a multicast group requires multiple messages between client and server. When a large number of channel change requests are made in a short period of time, the flood of associated IGMP messages can introduce significant delay into the network. In particular, delay associated with the IGMP messages can place limitations on the scalability of this fast channel technique.

In view of this, what is needed is a fast channel change technique that is able to efficiently accommodate large numbers of channel change requests that are received in a short period of time.

SUMMARY OF THE INVENTION

In a digital video network that is capable of distributing digital video content to a client via multicasting and unicasting, servicing a channel change request from a client involves switching from providing the digital video content to the client via multicasting to providing the digital video content to the client via unicasting and continuing to provide digital video content to the client via unicasting until a pre-established condition is met. Continuing to provide digital video content to the client via unicasting until a pre-established condition is met allows the network to opportunistically switch the client from unicasting back to multicasting. By opportunistically switching the client from unicasting back to multicasting, network resources can be intelligently managed to achieve efficient resource utilization.

In accordance with an embodiment of the invention, a technique for switching a client from unicasting back to multicasting involves simultaneously providing the digital video content to the client via unicasting and multicasting until the client has buffered duplicate frames (i.e., frames that contain the same digital video content). Once the client has buffered duplicate frames, the client can transition from playing out of a buffer that holds frames received via unicasting to playing out of a buffer that holds frames received via multicasting without skipping a frame. Once the transition back to multicasting is complete, unicasting is terminated and any frames remaining in the unicast buffer are flushed.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description, similar reference numbers may be used to identify similar elements.

DETAILED DESCRIPTION OF THE INVENTION

As used herein, the terms "multicast" and "multicasting" refer to a technique for providing the same digital video content to multiple clients in which the digital video content is delivered over common links only once (e.g., the digital video content is copied when it reaches nodes with links to multiple destinations). As used herein, multicast and multicasting are synonymous with the terms broadcast and broadcasting as related to, for example, hybrid fiber coaxial (HFC) cable networks.

As used herein, the terms "unicast" and "unicasting" refer to a technique for providing digital video content to a single specified client.

In some applications, the network for distributing digital video content is a packet-based network. In packet-based networks, multicasting may involve replicating packets at nodes that include multiple branches leading to different clients. The replication of packets at branching nodes eliminates the need to send multiple packets of the same content over the same link. Packet-based distribution networks may utilize, for example, IP, Ethernet, ATM, or a combination thereof to communicate digital video content. In packet-based networks, unicasting typically involves point-to-point messaging between nodes (e.g., servers and clients). Point-to-point messaging can be accomplished, for example, using well-known source/destination address based protocols (e.g., IP or Ethernet).

In some applications, the network for distributing digital video content includes an HFC network that utilizes radio frequency signals (RF) for local distribution of digital video content to the clients. In HFC networks, multicasting typically involves distributing all channels to all clients. Each client is able to receive any channel by tuning to the desired channel. In HFC networks, unicasting may involve distributing a channel, which is intended for only one client, to multiple clients and coordinating with the intended client so that only the intended client is able to receive to the desired channel. Even though the channel may be distributed to multiple clients, only one client, the intended client, is able to access the channel and display the digital video content. For purposes of this description, a communications technique such as this, which can be implemented in HFC networks, is considered unicasting.

Figure 1A:
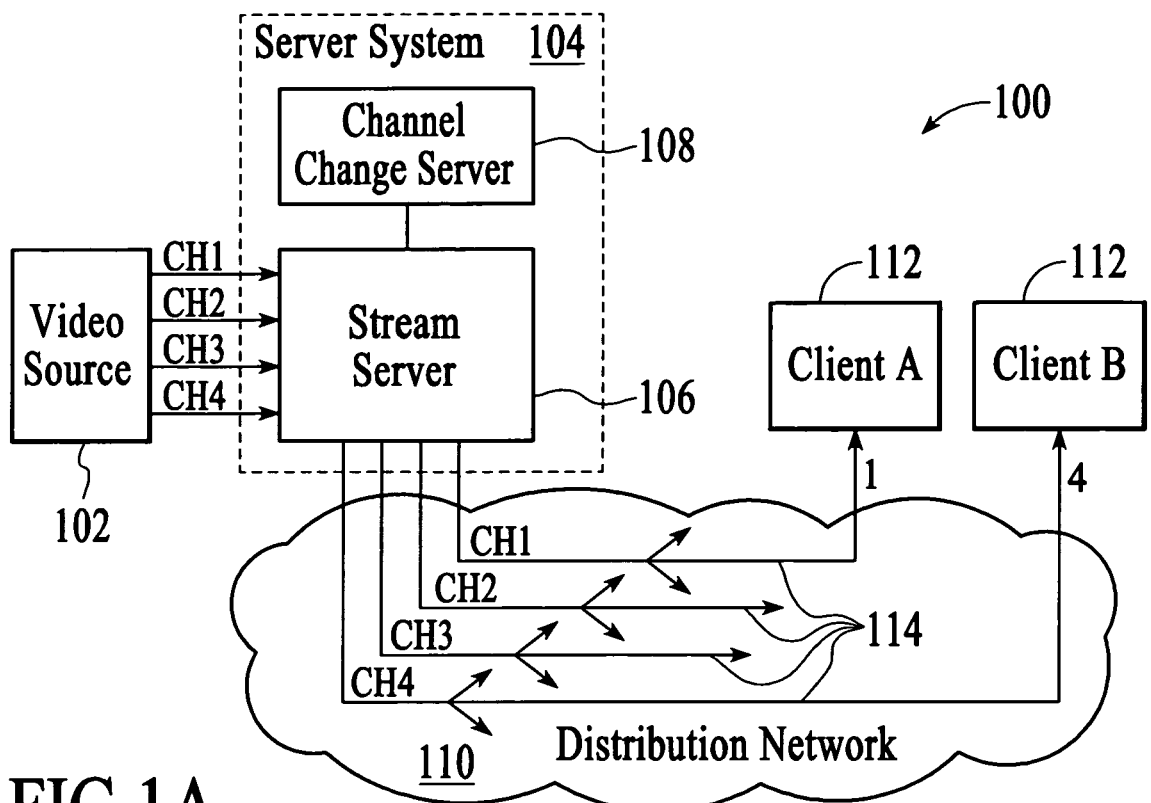
FIGS. 1A-1F illustrate a technique for servicing channel change requests in accordance with an embodiment of the invention.

FIGS. 1A-1F illustrate a technique for servicing channel change requests in accordance with an embodiment of the invention. Referring to FIG. 1A, the digital video network 100 includes a video source 102, a server system 104 having a stream server 106 and a channel change server 108, a distribution network 110, and clients 112. The video source provides multiple channels of digital video content to the stream server. The stream server ingests the digital video content from the video source and controls the distribution of the digital video content into the distribution network. The channel change server manages channel change requests that are received from the clients. The channel change server is described in more detail below.

The distribution network 110 supports the multicasting and unicasting of digital video content downstream to the clients 112. The distribution network also supports upstream unicast messaging from the clients to the stream server 106 and channel change server 108. The distribution network may utilize any network technology that supports multicasting and unicasting. In a packet-based environment, the distribution network may utilize, for example, routers, switches, DSLAMs, cable modem termination systems (CMTSs), passive optical network (PON) architectures, or any combination thereof. In an HFC environment, the distribution network may utilize, for example, a combination of routers, switches, and QAMs. The clients are systems that receive the digital video content from the distribution network and provide the digital video content to video display devices (e.g., televisions). The clients may be embodied as hardware, firmware, software, or any combination thereof and are sometimes referred to as set-top boxes (STBs). Clients in general are well-known in the field. Specific functions of the clients in accordance with the invention are described in more detail below.

Referring to FIG. 1A, multiple channels of digital video content are provided to the stream server 106. For example purposes, channels 1, 2, 3, and 4 are provided to the stream server although it should be understood that more channels could be provided. In this embodiment, the digital video content is real-time digital video content that is received at the video source 102 and passed to the stream server with little or no delay. For example, the digital video content includes real-time content from the content producers and/or distributors. The digital video content may include, for example, live content (e.g., live sporting events, news, etc.) or pre-recorded content that is released by the content producers and/or distributors. In other embodiments, the digital video content may be stored locally by the stream server, by a dedicated storage server, or within the distribution network 110. Whether the digital video content is real-time or stored locally, the digital video content is delivered to the stream server for distribution to the clients 112. The stream server supports the multicasting of the channels to any client that desires to receive the digital video content. As illustrated by the branching distribution arrows in FIG. 1A, all four channels can be distributed via multicasting 114 within the distribution network to reach multiple clients.

In the example of FIG. 1A, client A receives channel 1 via multicasting and client B receives channel 4 via multicasting. Although not shown, these channels can be received by multiple clients simultaneously via multicasting. Note, in an HFC network that utilizes RF for local distribution of digital video content to the clients, multiple channels may be provided simultaneously to multiple clients via the RF signals although only the desired channel is received and demodulated by the client.

Figure 1B:
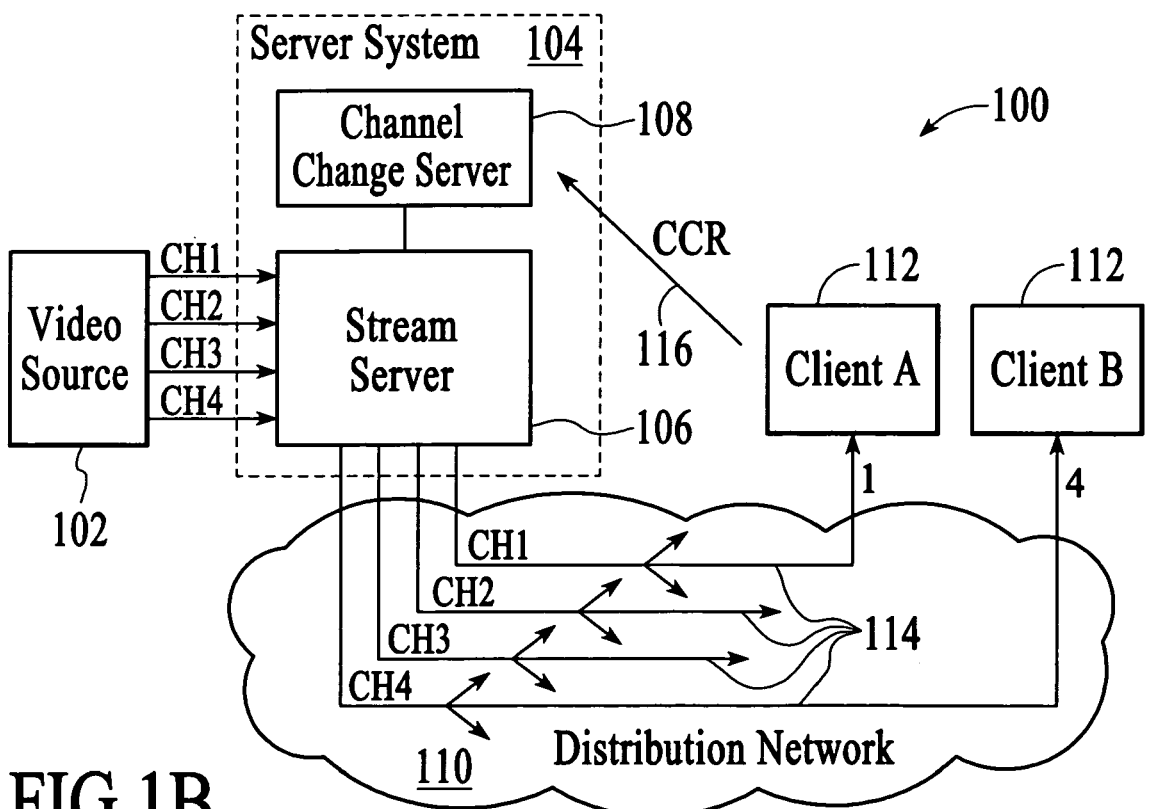
Figure 1C:
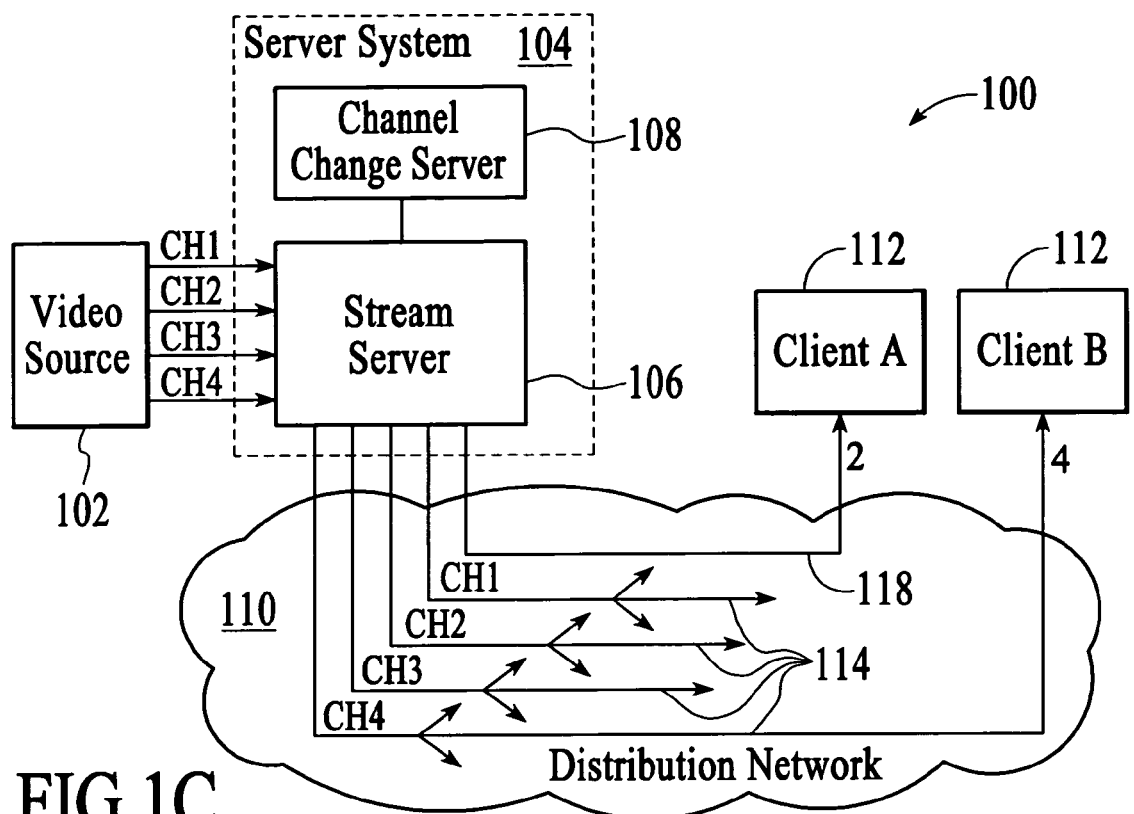

Referring to FIG. 1B, a channel change request (CCR) 116 is made by client A to change from channel 1 to channel 2. In an embodiment, the channel change request is provided to the channel change server 108 via a unicast message from the client 112 to the channel change server. The channel change request is serviced by providing the digital video content related to the requested channel to the client via unicasting. That is, digital video content related to the requested channel is provided to the client via unicasting instead of via multicasting. FIG. 1C depicts channel 2 being provided to client A via unicasting 118 instead of multicasting 114. In an embodiment, to achieve a fast change from channel 1 to channel 2 using unicasting instead of multicasting, a unicast session is established between the server system and the client and the stream server starts unicasting channel 2 with an I-frame. A technique for starting a unicast with an I-frame is described in more detail below.

In accordance with the invention and in contrast to the prior art, the digital video content related to channel 2 continues to be provided to the client 112 via unicasting until a pre-established condition is met. That is, multiple consecutive frames of digital video content related to channel 2 are unicast to the client and the client is not switched back to receiving digital video content via multicasting until some pre-established condition is satisfied. In particular, the client is not switched back to multicasting after the unicasting of a single I-frame as is known in the prior art. By not immediately switching back to multicasting after unicasting the single I-frame, the network is allowed to opportunistically switch the client from unicasting back to multicasting. By opportunistically switching the client from unicasting back to multicasting, network resources can be intelligently managed to achieve efficient resource utilization.

In accordance with the invention, exemplary pre-established conditions which could trigger a switch from unicasting back to multicasting include:

1) Expiration of a pre-established time interval;
2) Expiration of a pre-established time interval in which no channel change requests are received;
3) An explicit request to join multicasting (e.g., a request to switch back to multicasting or a request to exit a surf mode);
4) Reaching a pre-established resource threshold (e.g., switch back to multicasting only when certain resources are available);
5) Reaching a benefit threshold (e.g., switch back to multicasting only if a certain benefit is achieved or only if certain resources can be reclaimed).

Figure 1D:
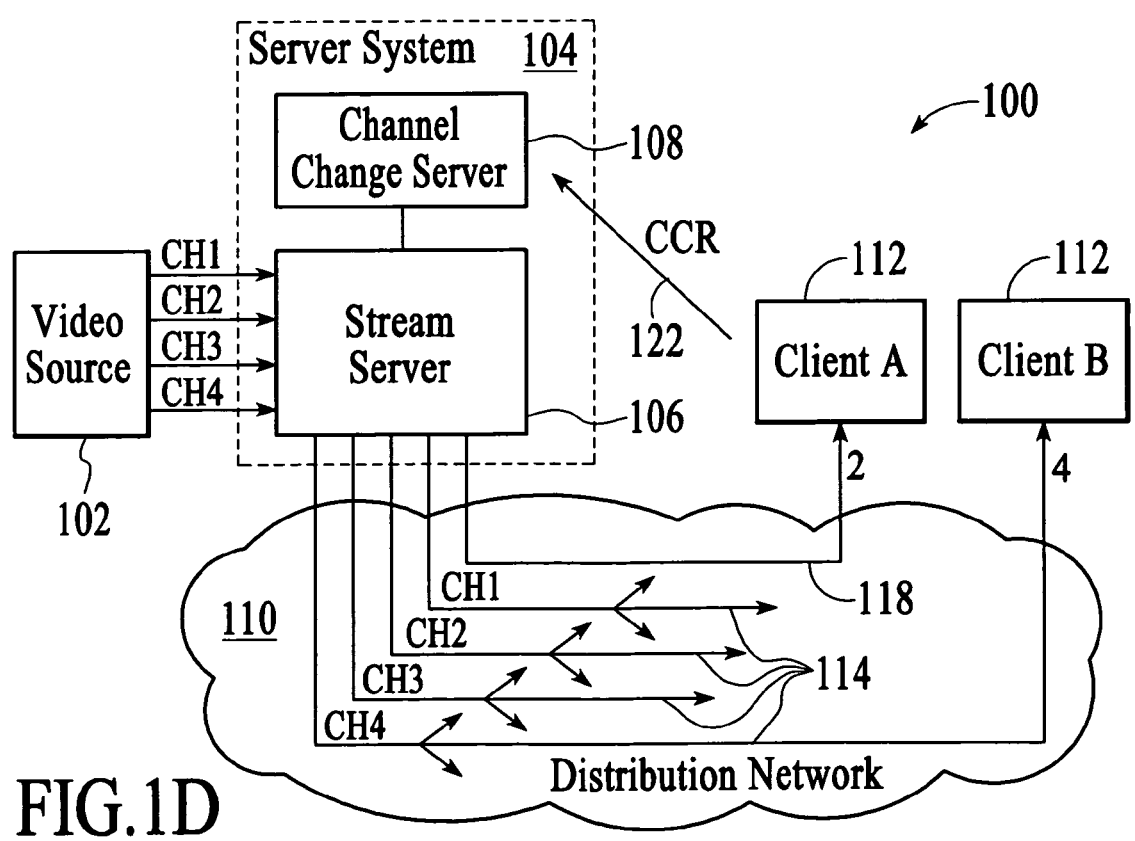
Figure 1E:
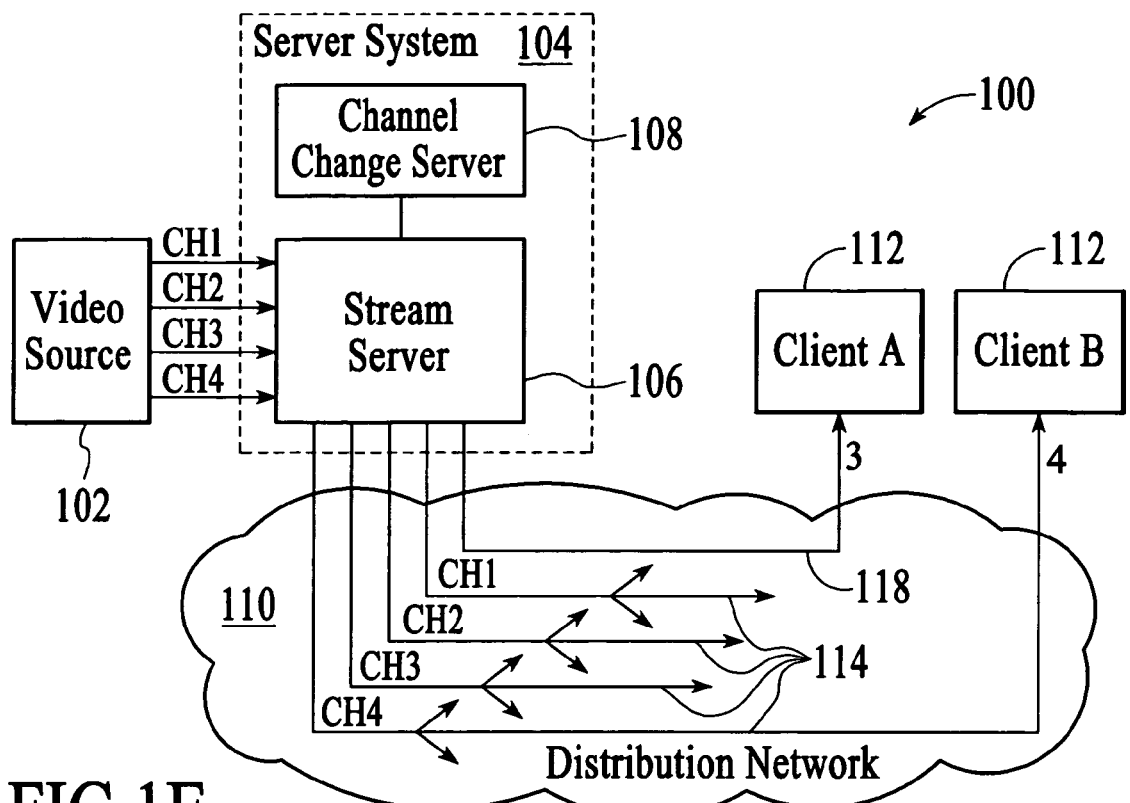

Before the client 112 is switched back to multicasting, if any additional channel change requests are made by the client (e.g., client A), the channel change requests are serviced via unicasting instead of multicasting. FIG. 1D depicts a channel change request 122 that is generated by client A before the client is switched from unicasting back to multicasting. In this case, client A is requesting a change to channel 3. In response to the channel change request, the digital video content related to channel 3 is provided to the client via unicasting instead of multicasting. FIG. 1E depicts channel 3 being provided to client A via unicasting instead of multicasting. The channel change requests can be serviced via unicasting by splicing the requested channel into the unicast session that was used to provide the previous channel. In an embodiment, the stream server indicates channel change boundaries between unicast streams by, for example, using a marker bit or an explicit signal at the first I-frame of a new unicast stream. Further, once the client detects the start of the new unicast stream, the client resets its decoder and flushes from its buffer undecoded frames related to the previous unicast stream.

Figure 1F:
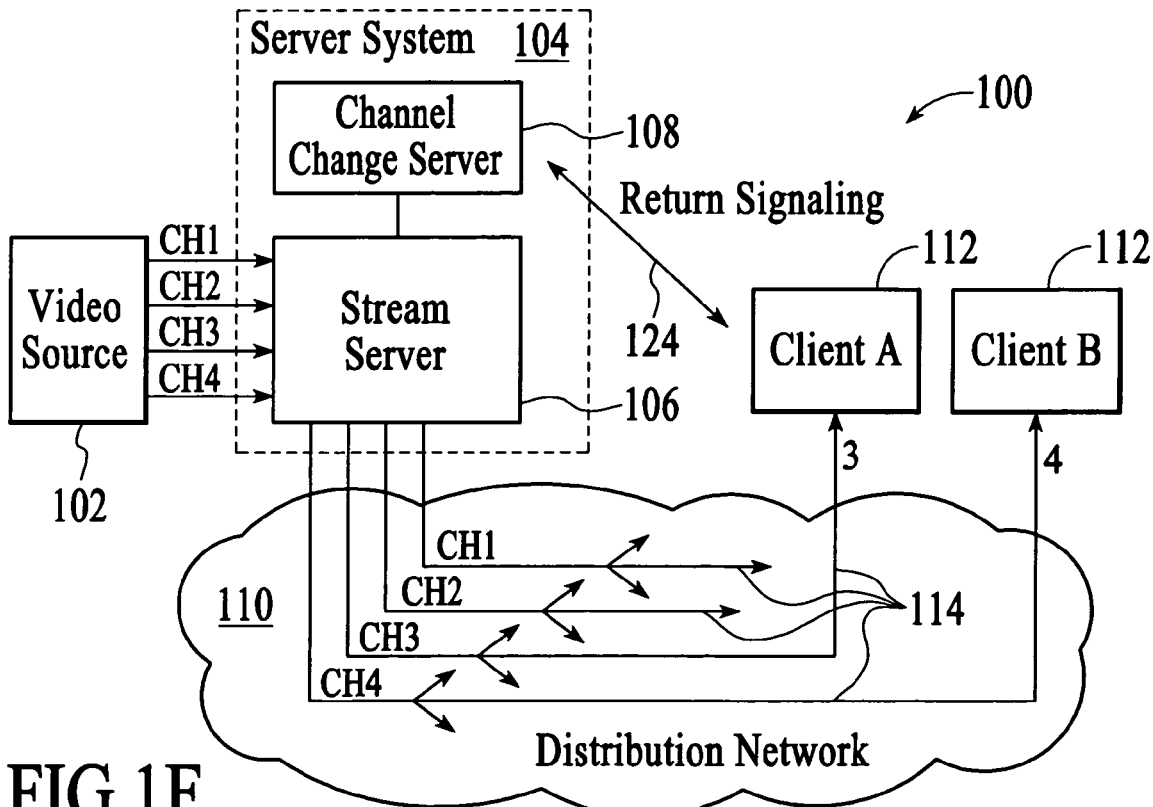

Once the pre-established condition is met, the process of switching back to providing digital video content to the client 112 via multicasting instead of unicasting is initiated. FIG. 1F depicts communications 124 between the channel change server 108 and client A that support the switching of client A from unicasting back to multicasting. FIG. 1F also depicts channel 3 being provided to client A via multicasting instead of unicasting after the switch has been completed. Note that in FIG. 1F the unicast session between the server system 104 and client A has been terminated.

Figure 2:
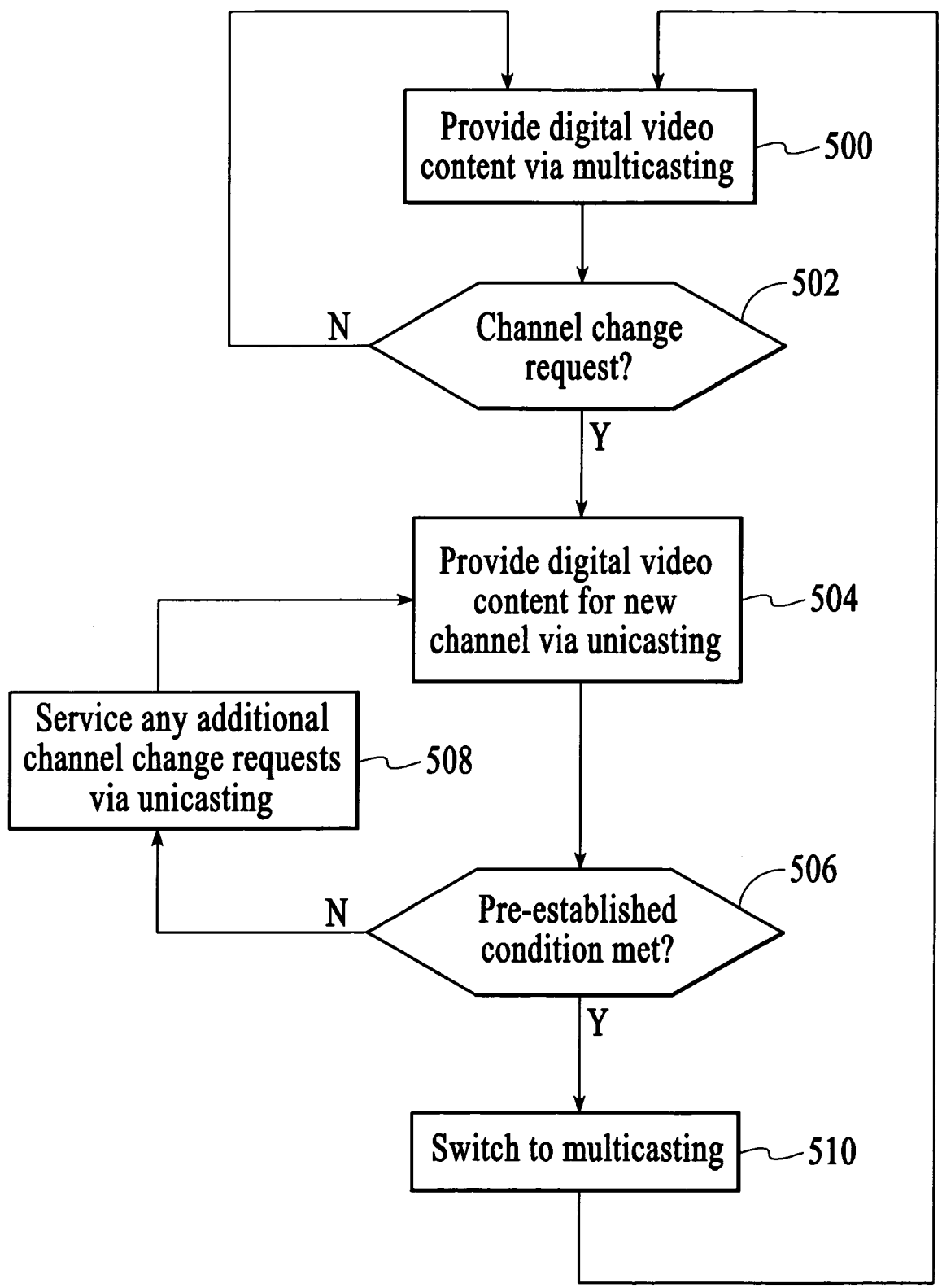
FIG. 2 depicts a process flow diagram of the above-described technique for servicing channel change requests in a digital video network that is capable of distributing digital video content to clients via multicasting and unicasting.

FIG. 2 depicts a process flow diagram of the above-described method for servicing channel change requests in a digital video network that is capable of distributing digital video content to clients via multicasting and unicasting. At block 500, digital video content is provided to a client via multicasting. At decision point 502, it is determined if there has been a channel change request. If there is no channel change request, then the digital video content continues to be provided to the client via multicasting. If there is a channel change request, then digital video content for the new channel is provided to the client via unicasting instead of multicasting (block 504). In an embodiment, unicasting of the new channel involves starting the unicast with the first buffered I-frame and continuing to unicast multiple consecutive frames of the digital video content related to the requested channel. In accordance with an embodiment of the invention, digital video content continues to be provided to the client via unicasting until a pre-established condition is met. As long as the pre-established condition has not been met (the "N" branch at decision point 506), digital video content continues to be provided via unicasting (block 504) and any additional channel change requests are serviced via unicasting (block 508). Once the pre-established condition is met (the "Y" branch at decision point 506), a switch is made from unicasting back to multicasting (block 510). Some techniques for making a smooth transition from unicasting to multicasting are described below. After the switch is complete, digital video content is once again provided to the client via multicasting (block 500).

FIG. 2 can be viewed from the perspective of the server system 104 (e.g., the stream server 106 and/or the channel change server 108). Alternatively, FIG. 2 can be viewed from the perspective of the client 112 by modifying block 500 to read 'receive' digital video content via multicasting instead of 'provide' digital video content via multicasting and by modifying block 504 to read 'receive' digital video content for new channel via unicasting instead of 'provide' digital video content for new channel via unicasting.

Figure 3:
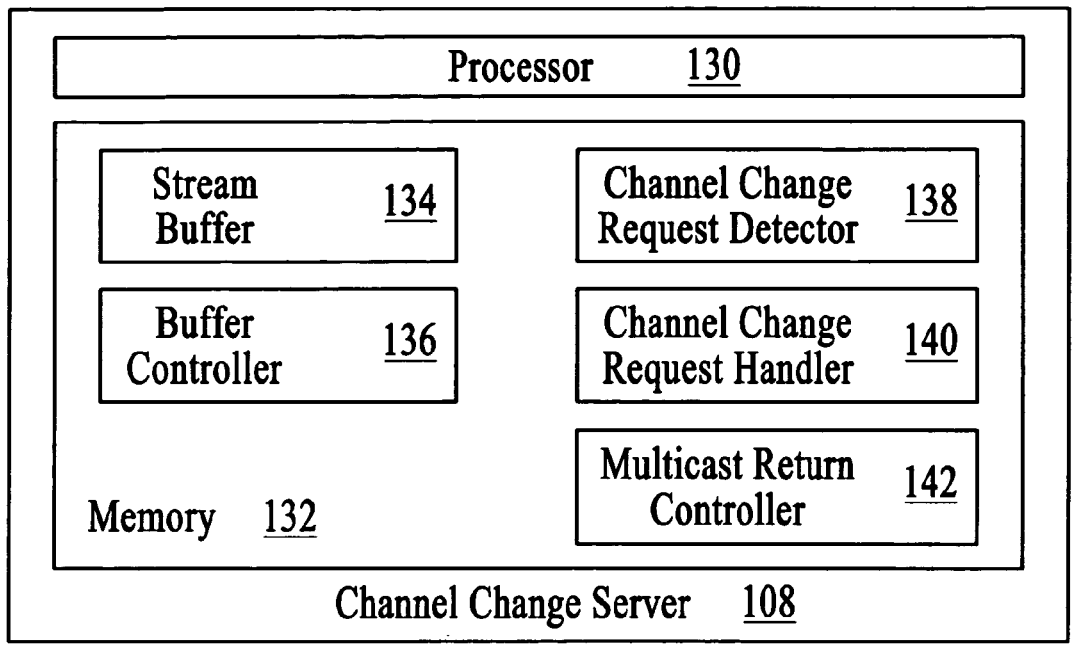
FIGS. 3 and 4 depict an embodiment of a channel change server and a client, respectively, which are configured to service channel change requests in accordance with an embodiment of the invention.
Figure 4:
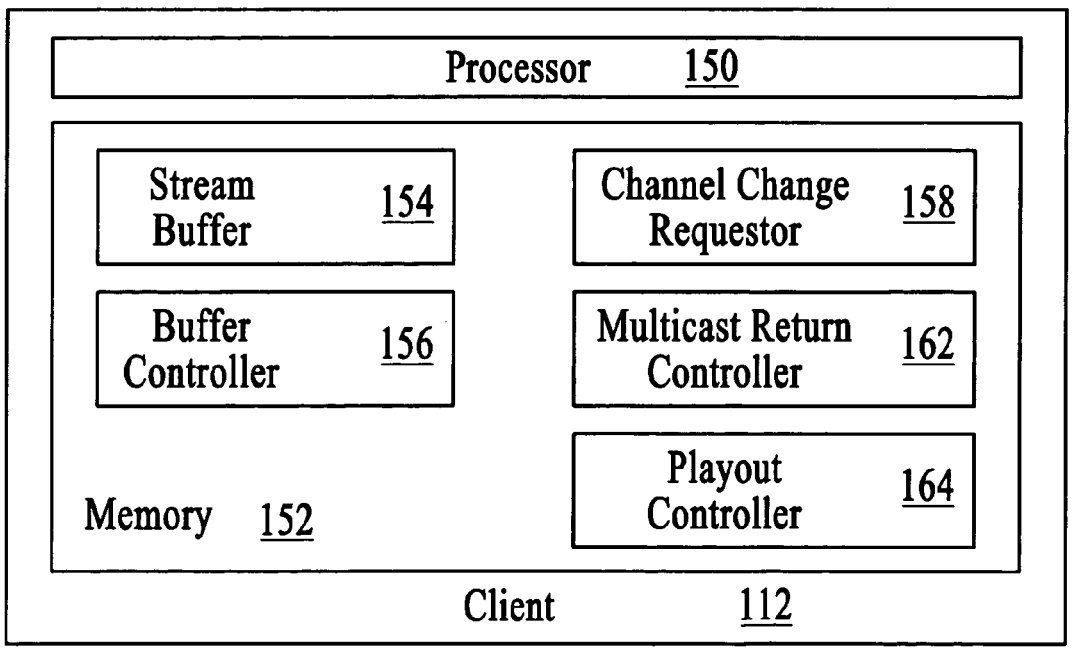

FIGS. 3 and 4 depict an embodiment of a channel change server 108 and a client 112, respectively, which are configured to service channel change requests as described above. With reference to FIG. 3, the channel change server includes a processor 130 and memory 132. The memory includes a stream buffer 134, a buffer controller 136, a channel change request detector 138, a channel change request handler 140, and a multicast return controller 142. The buffer controller manages the buffering of digital video content that is streamed into the stream server. The buffered streams are held in the stream buffer for a limited period of time. In an embodiment, approximately one-half to two seconds from each stream is continuously buffered in the stream buffer. The channel change request detector detects channel change requests that are generated by the clients. In an embodiment, channel change requests are unicast messages that are addressed to the channel change server or forwarded to the channel change server through an intermediate server. The channel change request handler manages the switch from multicasting to unicasting that occurs in response to a channel change request. The multicast return controller manages the switch from unicasting back to multicasting once the pre-established condition is met. In an embodiment, the multicast return controller actively monitors the pre-established condition and in other embodiments, the multicast return controller receives a signal indicating that the pre-established condition has been met.

With reference to FIG. 4, the client 112 includes a processor 150 and memory 152. The memory includes a stream buffer 154, a buffer controller 156, a channel change requestor 158, a multicast return controller 162, and a playout controller 164. The buffer controller manages the buffering of an incoming stream (or streams if the client is able to simultaneously ingest multiple streams) into the stream buffer. The channel change requestor generates the channel change requests that are provided to the channel change server 108. In an embodiment, the channel change requestor generates a unicast message, which is addressed directly to the channel change server, as the channel change request. The multicast return controller of the client manages the switch from unicasting back to multicasting and the playout controller controls the playout of digital video content from the stream buffer.

Figure 5:
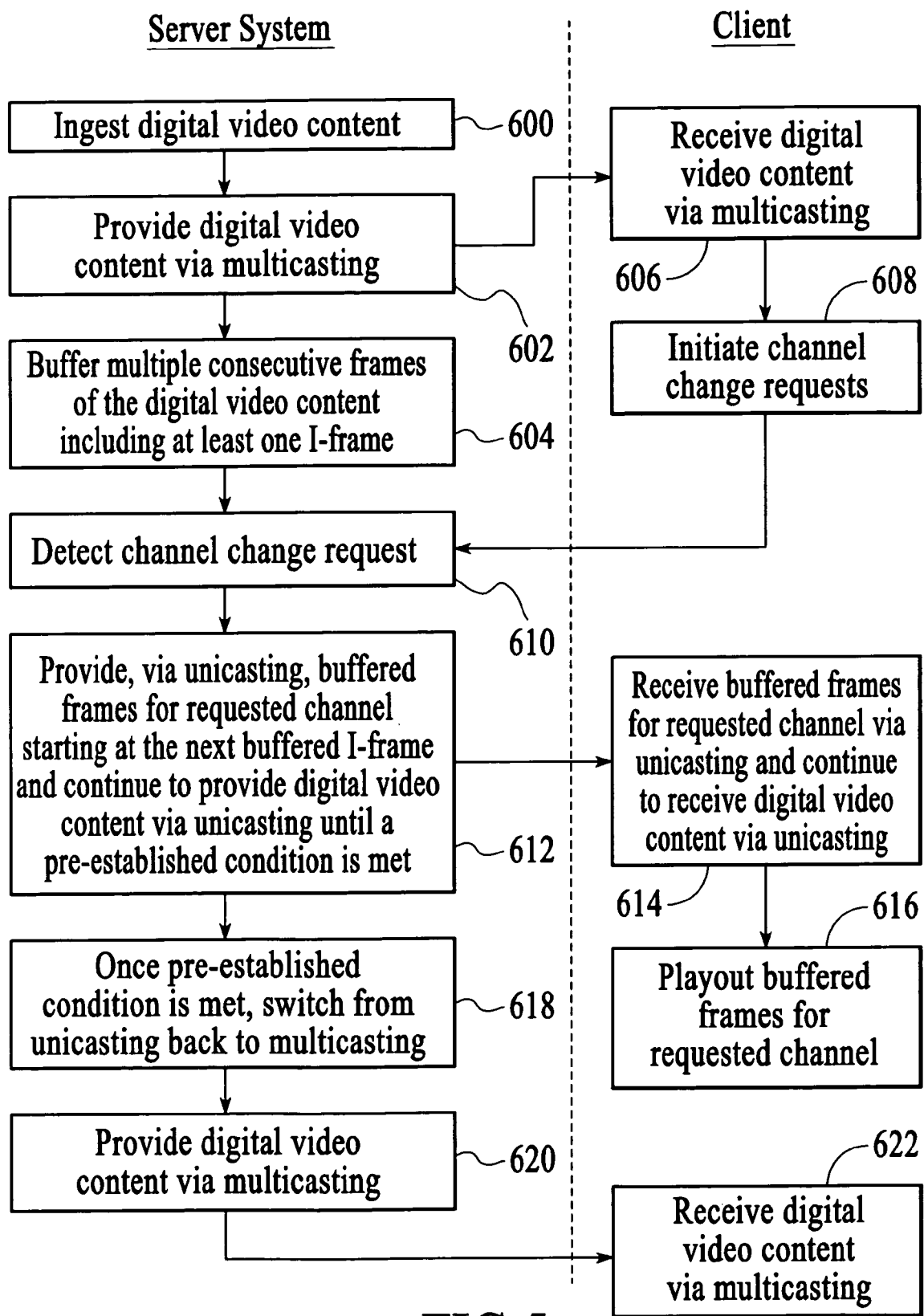
FIG. 5 depicts an exemplary process flow diagram that illustrates the interaction between a server system and a client related to servicing a channel change request.

In an embodiment, channel change requests are serviced through interaction between the server system 104 and the client 112. FIG. 5 depicts an exemplary process flow diagram that illustrates the interaction between the server system (i.e., the channel change server 108 and/or the stream server 106) and a client 112 related to servicing a channel change request. At block 600, digital video content is ingested, for example, at the stream server. In an embodiment, real-time digital video content for multiple channels is received at the stream server and portions of each channel are buffered by the channel change server for use in servicing channel change requests. At block 602, digital video content is provided to the client via multicasting. At block 604, multiple consecutive frames of digital video content, including at least one I-frame are buffered. At block 606, the client receives the digital video content via multicasting. At block 608, a channel change request is initiated by the client and at block 610 the channel change request is detected by the channel change server. In response to the channel change request, at block 612, buffered frames for the requested channel are provided to the client via unicasting. In an embodiment, the buffered frames are provided starting at the first buffered I-frame and the digital video content continues to be provided to the client via unicasting until a pre-established condition is met. At block 614, the client receives the buffered frames via unicasting and at block 616 the buffered frames for the requested channel are played out. Once the pre-established condition is met, a switch is made from unicasting back to multicasting (block 618). Upon switching from unicasting back to multicasting, digital video content is again provided to the client via multicasting (block 620). At block 622, the client receives the digital video content via multicasting instead of unicasting.

Figure 6:
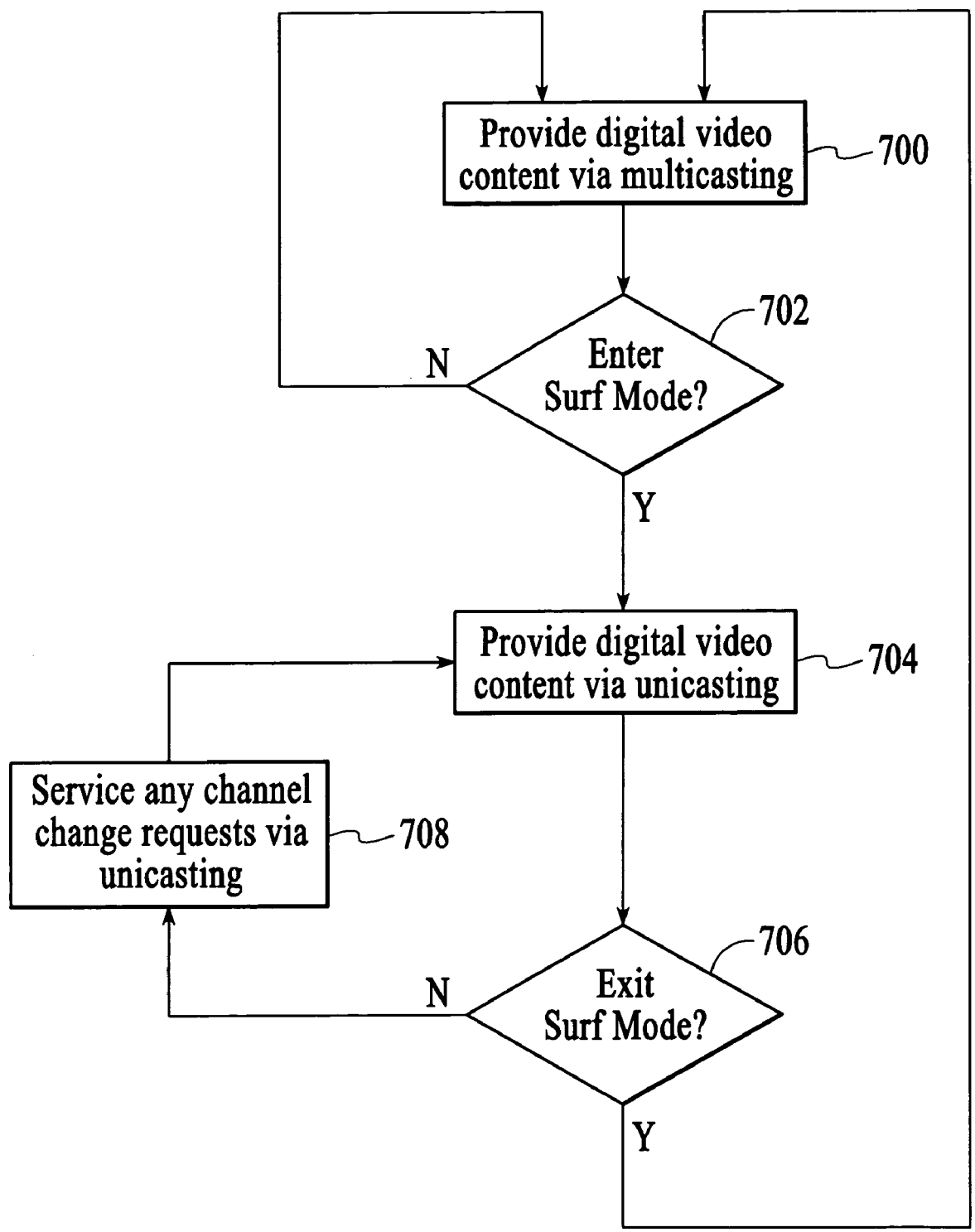
FIG. 6 is an exemplary process flow diagram of surf mode logic in accordance with an embodiment of the invention.

In an alternative embodiment of the invention, whether the digital video content is provided via multicasting or unicasting is a function of whether or not the client is in "surf mode." When the client is not in surf mode, digital video content is provided to the client via multicasting and when the client is in surf mode, digital video content is provided to the client via unicasting. FIG. 6 is an exemplary process flow diagram of the surf mode logic. In this example, the client is initially not in surf mode and at block 700, digital video content is provided to the client via multicasting. As indicated by the "N" branch at decision point 702, as long as the client is not in surf mode, digital video content continues to be provided via multicasting. Once the client enters surf mode (the "Y" branch at decision point 702), digital video content is provided to the client via unicasting (block 704). As long as the client stays in surf mode (the "N" branch at decision point 706), digital video content continues to be provided to the client via unicasting and any channel change requests are serviced via unicasting (block 708). Once the client exits surf mode (the "Y" branch at decision point 706), digital video content is provided to the client via multicasting instead of unicasting. Surf mode can be entered in response to, for example, a channel change request or an explicit command to enter surf mode. Surf mode can be exited in response to, for example, the expiration of a pre-established time period, the expiration of a pre-established time period in which no channel change requests are generated by the client, an explicit exit command, or some other condition such as one of the pre-established conditions identified above. The surf mode status of a client can be, for example, indicated by a state machine or held in memory at the client, the channel change server, the stream server, or any combination thereof.

FIG. 6 can be viewed from the perspective of the server system 104 (e.g., the stream server 106 and/or the channel change server 108). Alternatively, FIG. 6 can be viewed from the perspective of the client 112 by modifying block 700 to read 'receive' digital video content via multicasting instead of 'provide' digital video content via multicasting and by modifying block 704 to read 'receive' digital video content via unicasting instead of 'provide' digital video content via unicasting.

Figure 7A:
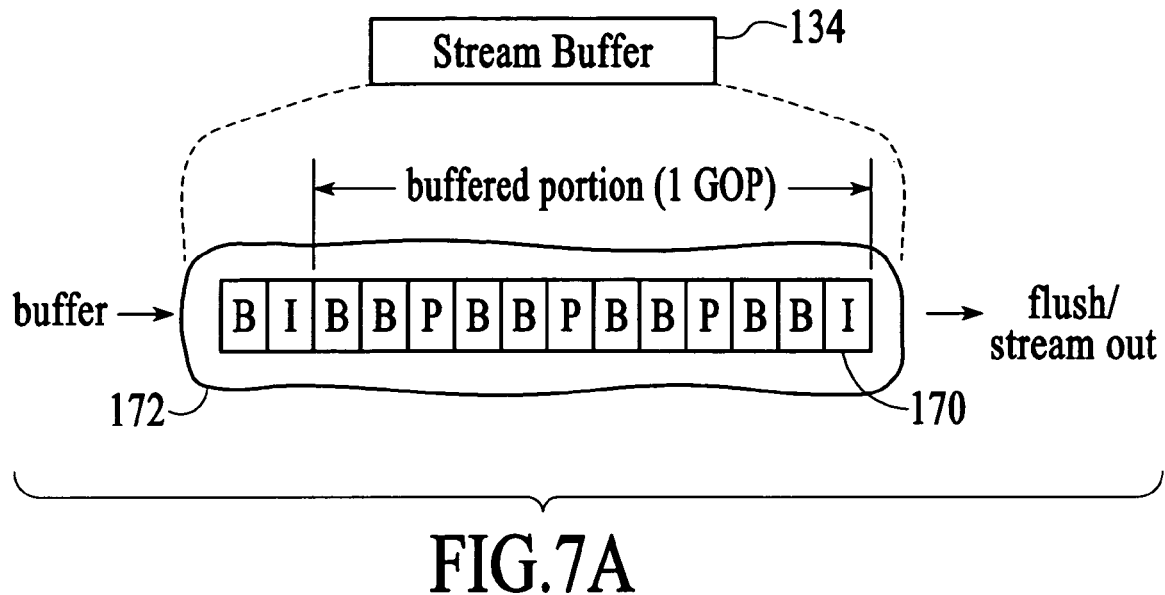
FIGS. 7A-7C depict a process of servicing a channel change request via unicasting.
Figure 7B:
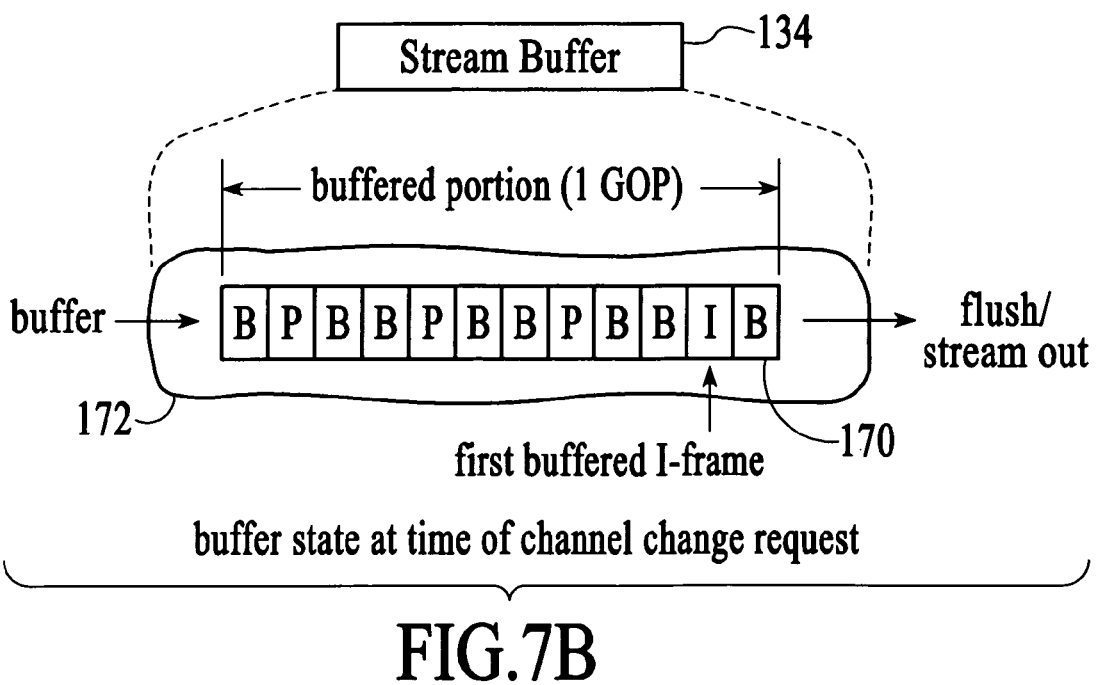
Figure 7C:
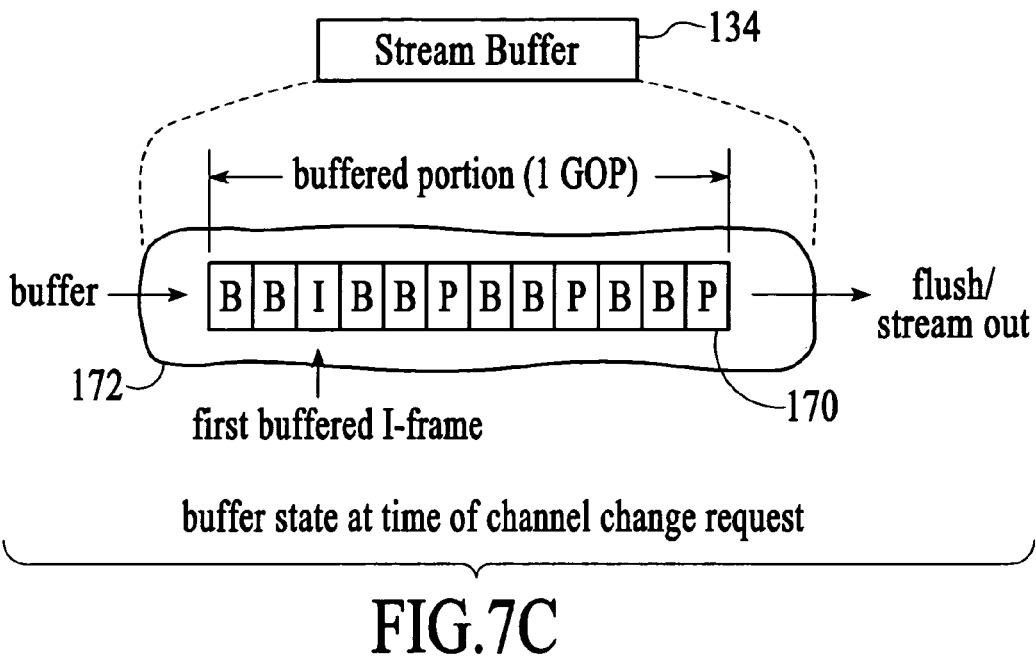

An embodiment of the process of servicing a channel change request via unicasting is now described with reference to FIGS. 7A-7C. FIG. 7A depicts the stream buffer 134 of the stream server 106 and a portion of one of the ingested streams, for example, the digital video content for channel 2. In an embodiment, the stream buffer buffers up to 1 group of pictures (GOP) worth of each ingested stream, where a GOP is defined as a series of multiple consecutive frames beginning with an I-frame and continuing until the last frame before the next I-frame. As depicted in FIG. 7A, the buffered portion of the digital video content 172 includes 12 frames 170 consisting of one I-frame, three P-frames, and eight B-frames, although more frames could be buffered. In this embodiment, the stream buffer is a continual moving buffer whose width is sufficient to assure that at least one I-frame (or I-frame equivalent) is contained within the buffer at any point in time. The stream buffer could alternatively be larger than one GOP, thereby ensuring that more than one I-frame is contained within the buffer at any point in time. Note that the exact location of the I-frame relative to other frames in the buffer will vary with time.

In the convention used in FIG. 7A, frames are received into the buffer 134 on the left side and flushed from the buffer or streamed out of the buffer from the right side. Therefore, the age of the frames in the buffer decreases from right to left such that the rightmost frame has been buffered for the most amount of time and the leftmost frame has been buffered for the least amount of time.

As described above, a channel change request is serviced by providing digital video content related to the requested channel to the client 112 via unicasting instead of multicasting. In particular, the unicast session starts with the first buffered I-frame and continues with the buffered frames that come after the first I-frame. FIG. 7B depicts the state of a channel-specific buffer at the time a channel change request is received. In order to achieve a fast channel change, the unicast session begins with the first buffered I-frame and continues with the frames 170 (including B, P, and I frames) that consecutively follow the first I-frame. In an embodiment, the buffered portion of the digital video content is wide enough to include at least one I-frame (or an I-frame equivalent). FIG. 7C depicts the state of the channel-specific buffer 134 when a channel change request is received at a different time than in FIG. 7B. FIG. 7C illustrates that the first buffered I-frame can be located in different positions throughout the buffered frames depending on the time at which the channel change request is received.

In an embodiment, the server system is configured such that the multicast streams are streamed out slightly ahead of any unicast streams. That is, duplicate frames of digital video content will be streamed via multicasting slightly before the corresponding frames are streamed via multicasting. As will be seen, the fact that multicast streams are slightly ahead of their corresponding unicast streams can be used advantageously to transition the client from unicasting to multicasting without skipping a frame.

Switching from unicasting back to multicasting may be accomplished using many different techniques. Although there are many different techniques that can be used to switch from unicasting back to multicasting, it is desirable to make the switch without causing any disruption to the playout of the digital video content by the client 112. For example, it is desirable to avoid skipping any frames that make up the stream of digital video content. A seamless switch from unicasting back to multicasting can be accomplished, for example, using one of the techniques described below.

A first technique for switching a client from unicasting back to multicasting involves accumulating enough digital video content at the client to bridge the time it takes to transition from receiving the digital video content via unicasting to receiving the digital video content via multicasting. The transition time is a function of the network specifics. For example, in HFC networks that utilize RF for local delivery of digital video content to the clients, the transition time is a function of how long it takes to retune the tuner to a new channel. In IP-based networks, the transition time is a function of how long it takes to join the client to the corresponding multicast group. In accordance with an embodiment of the invention, digital video content is accumulated at the client by temporarily increasing the stream rate of the unicast stream above the playout rate. While the digital video content is being streamed at the increased rate, the amount of digital video content stored in the client's stream buffer grows (as opposed to staying the same, which is the case when the stream rate is the same as the playout rate). That is, the number of frames in the client's stream buffer increases while the stream rate is increased. The stream rate is held at the increased rate until the client accumulates enough frames in its buffer to be able to bridge the time it takes to transition from receiving the digital video content via unicasting to receiving the digital video content via multicasting. For example, if the transition time from unicasting to multicasting is approximately 1 second, then the stream rate is increased until the client is able to accumulate at least 1 second worth of frames in the stream buffer. In an embodiment, the transition time includes the time required to make the switch from unicasting to multicasting plus the maximum delay that can be attributed to waiting for the next I-frame to arrive at the client (e.g., equal to the time of one GOP).

Figure 8:
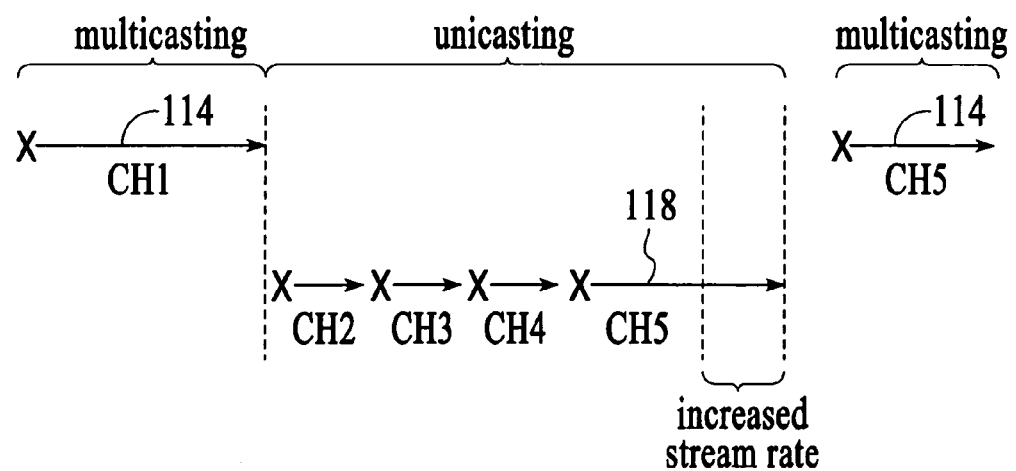
FIG. 8 illustrates a technique for switching a client from unicasting back to multicasting in accordance with an embodiment of the invention.

Operation of this technique is described with reference to FIGS. 8 and 9A-9D. Referring to FIG. 8, the client is initially receiving channel 1 via multicasting. At some point the client requests a channel change to channel 2. In response to the channel change request and as described above, channel 2 is provided to the client via unicasting 118. Additional channel change requests to channels 3, 4, and 5 are also serviced via unicasting. At some point, the transition back to multicasting is initiated and the stream rate of the unicasting stream is increased so that the client can accumulate enough frames to bridge the transition from unicasting to multicasting. As the client is accumulating frames, the client continues to playout buffered frames that were received via unicasting. When enough additional frames have been accumulated via unicasting, the client disables reception of the unicast stream and initiates a process to terminate unicasting and receive the digital video content related to the current channel via multicasting. During the transition time between when the unicast stream is terminated and before the multicast stream is received, no frames are received at the client and the client plays out the buffered frames that were accumulated in the buffer via unicasting. When the client begins receiving frames via multicasting, the received frames are written into a separate multicast buffer. In an embodiment, an identification is made in the client between the initial multicasting time point and the corresponding time point in the unicast stream. When the unicast stream has played out to this time point, playout switches to the multicast buffer. At this point, the transition to multicasting is complete and the remaining frames in the unicast buffer may be flushed as they are no longer needed for playout. The above-described technique is especially applicable to clients that are limited to receiving a single stream at a time and to cases with limited bandwidth headroom constraint (e.g., DSL).

Figure 9A:
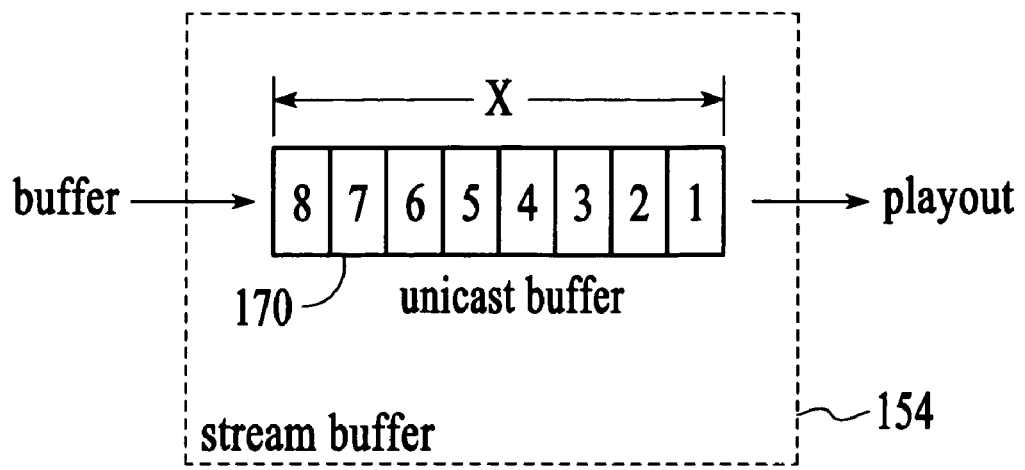
FIGS. 9A-9D depict exemplary states of the client's stream buffer with respect to the technique described with reference to FIG. 8.

Exemplary states of the client's 112 stream buffer 154 are illustrated with respect to this technique in FIGS. 9A-9D. FIG. 9A depicts a unicast buffer that is in steady state. In steady state, the rate of frame playout is roughly equal to the rate of frame buffering and therefore the depth, x, of the buffer is static. It should be noted that in some implementations, the buffer depth is virtually zero before the rate increase. That is, there is relatively little if any buffering of frames. The technique described herein is applicable regardless of whether or not unicast frames are buffered.

Figure 9B:
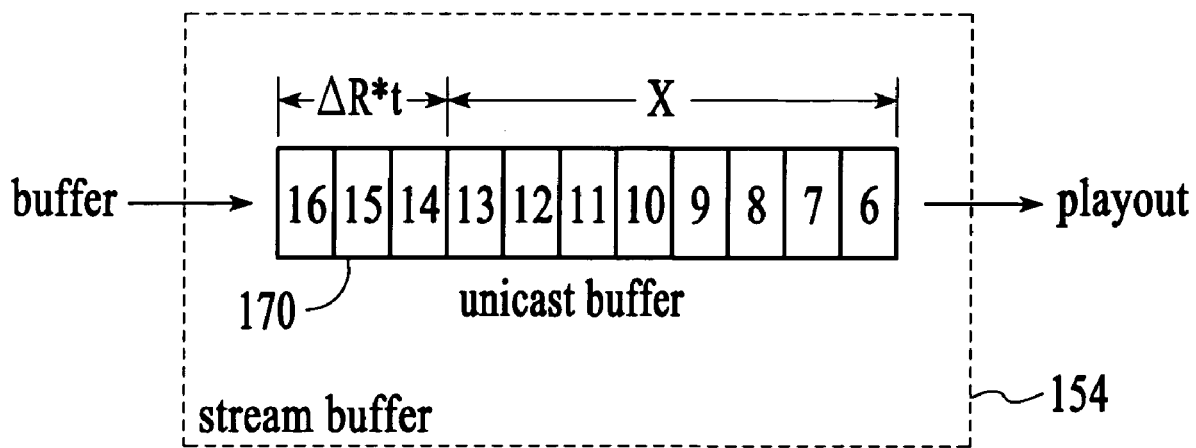
Figure 9C:
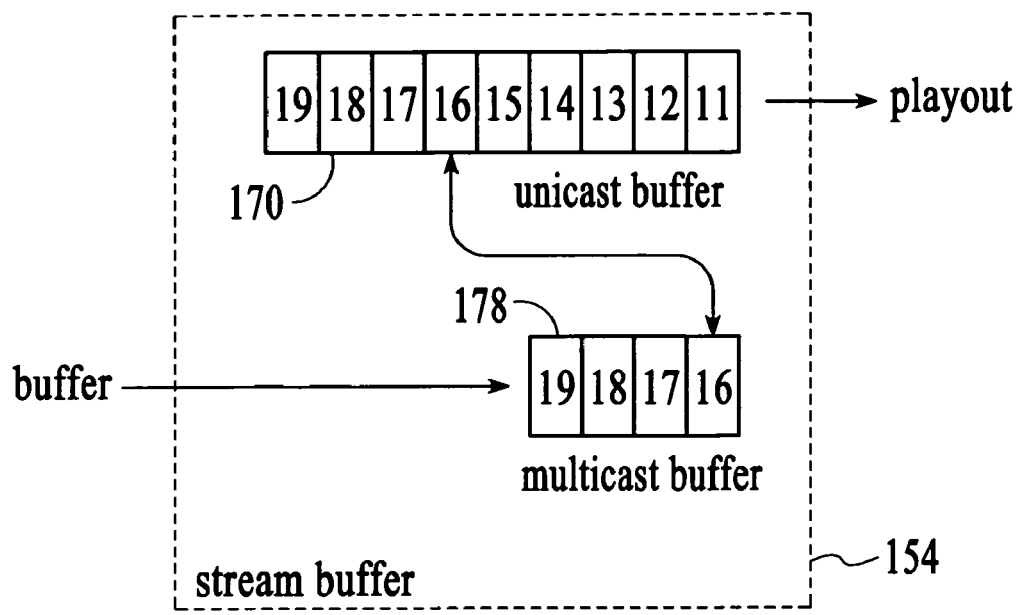
Figure 9D:
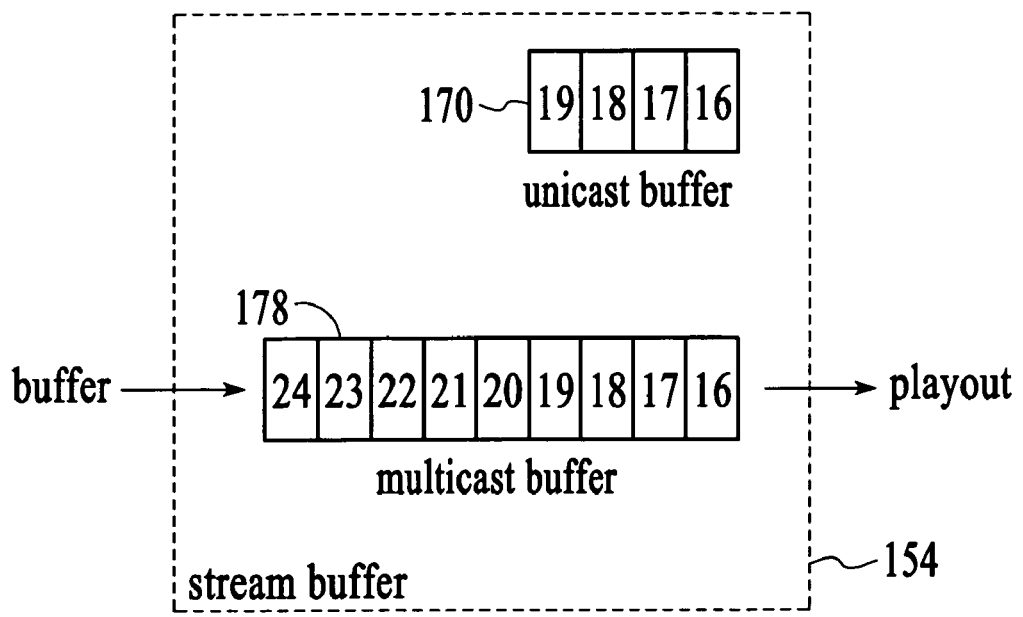

FIG. 9B depicts the unicast buffer after receiving frames at an increased rate for a time interval of t. The depth of the buffer after time interval t is the rate increase ($\Delta R$) multiplied by the time interval t plus the steady state depth x, or buffer depth=$\Delta R*t+x$. FIG. 9C depicts the unicast buffer and a multicast buffer that is initiated in response to the switch from unicasting to multicasting. In FIG. 9C, the unicast buffer is no longer receiving new frames while the multicast buffer is just beginning to receive new frames. The client continues to playout from the unicast buffer until it reaches the point at which it can transition to playing out from the multicast buffer without skipping a frame. As illustrated in FIGS. 9C and 9D, the client can stop playing out of the unicast buffer after frame 15 and can begin playing out of the multicast buffer at frame 16.

Although in this embodiment, the process of switching to multicasting is initiated right after the client accumulates enough frames, in other embodiments, the client may wait to initiate the switch. Although a two buffer implementation is described with reference to FIGS. 9A-9D, other implementations are possible. The above-described technique for switching from unicasting to multicasting applies also to network protocols that use variable bit rate (VBR) schemes as long as the amount of content in the buffer is increased.

A second technique for switching a client from unicasting back to multicasting involves simultaneously providing the digital video content to the client via unicasting and multicasting until the client has buffered duplicate frames (i.e., frames that contain the same digital video content). Once the client has buffered duplicate frames, the client can transition from playing out of a buffer that holds frames received via unicasting to playing out of a buffer that holds frames received via multicasting without skipping a frame. Once the transition back to multicasting is complete, unicasting is terminated and any frames remaining in the unicast buffer are flushed.

Figure 10:
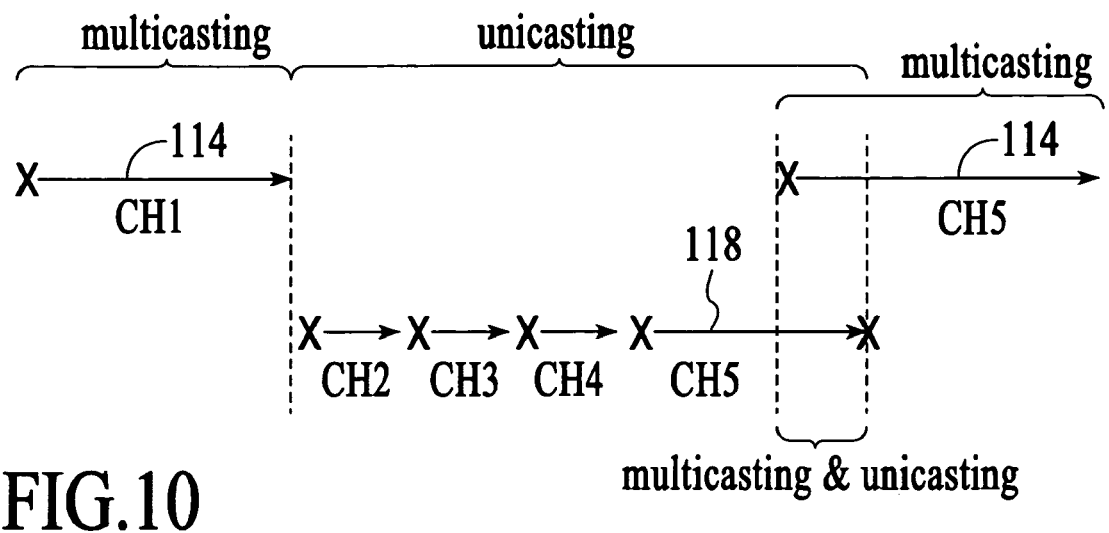
FIG. 10 illustrates another technique for switching a client from unicasting back to multicasting in accordance with an embodiment of the invention.

Operation of this technique is described with reference to FIGS. 10 and 11A-11D. Referring to FIG. 10, the client is initially receiving channel 1 via multicasting. At some point the client requests a channel change to channel 2. In response to the channel change request and as described above, channel 2 is provided to the client via unicasting. Additional channel change requests to channels 3, 4, and 5 are also serviced via unicasting. At some point, the transition back to multicasting is initiated and for a limited period of time, a multicast stream is provided to the client concurrent with the unicast stream. Assuming the multicast stream is ahead of the unicast stream in time, the frames received via multicasting have not yet been displayed (i.e., the corresponding frames in the unicast buffer have not yet been played out). The client receives and buffers the digital video content via both unicasting and multicasting until the client begins to buffer duplicate frames via unicasting and multicasting. In an embodiment, the client buffers digital video content received via both unicasting and multicasting for a period of approximately 0.5 to 2 seconds. While the client is receiving frames via both unicasting and multicasting, the frames are buffered in respective unicast and multicast buffers. Once the client begins to buffer duplicate frames, the client can switch to playing out frames from the multicast buffer instead of the unicast buffer without skipping a frame. Once the client switches to playing out frames from the multicast buffer, unicasting to the client can be terminated and the unicast buffer can be flushed.

Figure 11A:
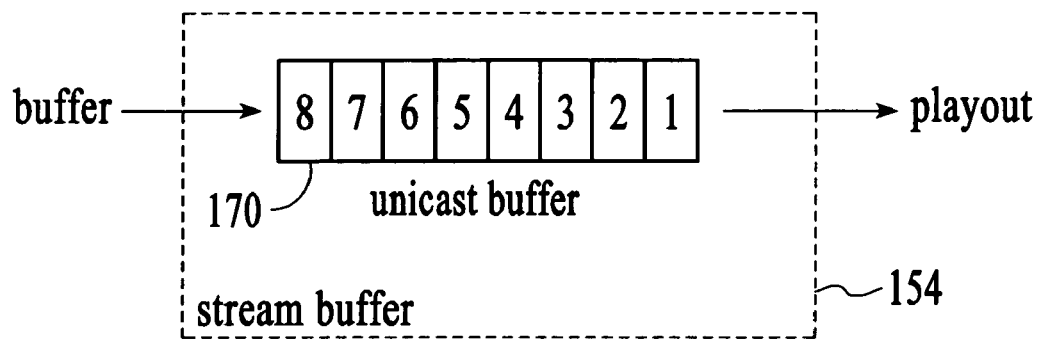
FIGS. 11A-11D depict exemplary states of the client's stream buffer with respect to the technique described with reference to FIG. 10.

Exemplary states of the client's stream buffer 154 related to this technique are illustrated in FIGS. 11A-11D. FIG. 11A depicts the stream buffer with only a unicast buffer active. At this point in time, the client is receiving frames 170 via unicast only. It should be noted that in some implementations the unicast buffer is maintained essentially at zero frames, that is, there is very little if any buffering of frames. The technique described herein is applicable regardless of whether or not unicast frames are buffered.

Figure 11B:
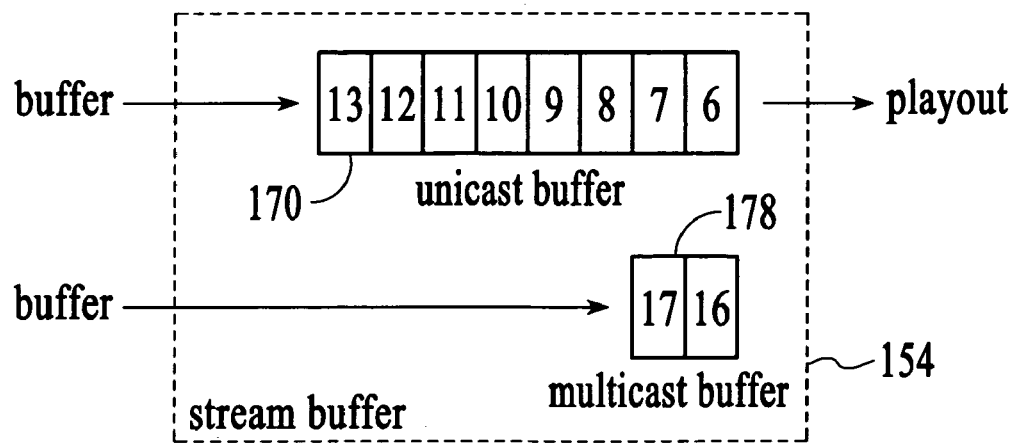
Figure 11C:
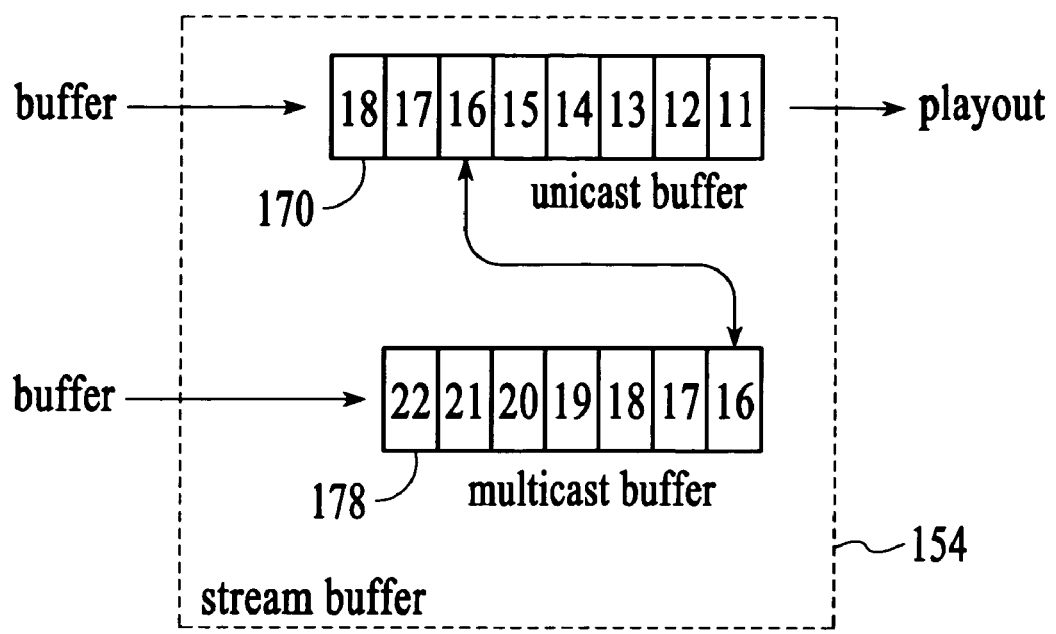
Figure 11D:
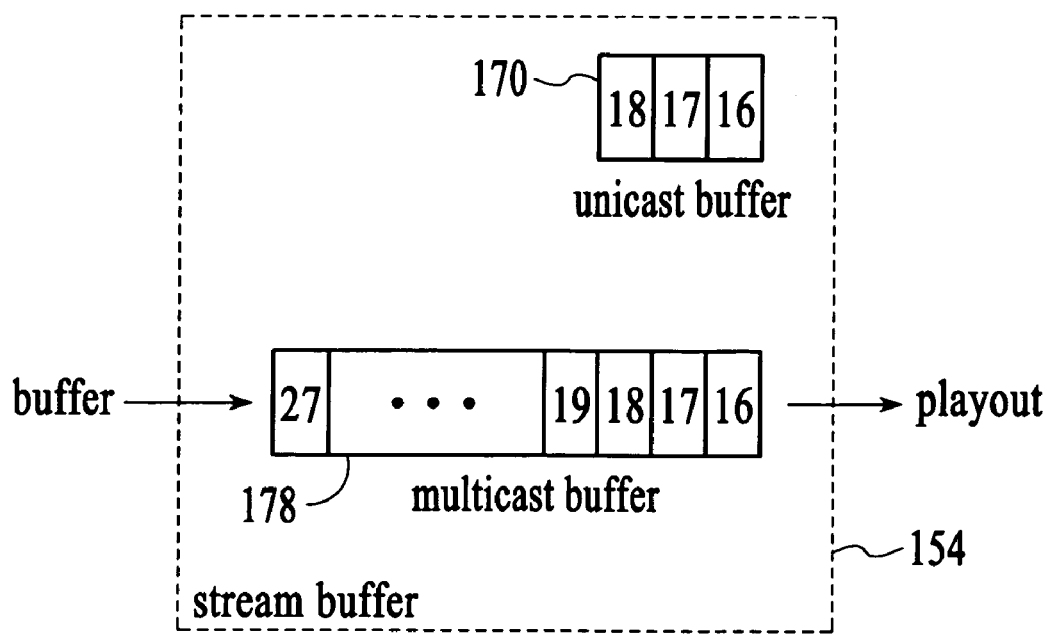

Once the client begins to receive digital video content related to the current channel via multicasting in addition to unicasting, the multicast frames are buffered in a multicast buffer. FIG. 11B depicts the stream buffer 154 with both a unicast buffer and a multicast buffer. As depicted in FIG. 11B, frames 170 and 178 are received into both the unicast and multicast buffers but only played out of the unicast buffer. At some point, the unicast and multicast buffers begin to buffer duplicate frames. For example, FIG. 11C depicts the unicast and multicast buffers having duplicate frames starting at frame 16. Once the unicast and multicast buffers contain duplicate frames, the playout controller 164 can transition to playing out from the multicast buffer. In an embodiment, the transition to the multicast buffer can occur at the first duplicate frame (e.g., frame 16 in FIG. 11C). Alternatively, the transition can be made at any convenient point. FIG. 11D depicts the stream buffer after the unicast buffer has stopped receiving new frames and after playout has switched to the multicast buffer.

The join operation involves making a unique identification between a frame in the unicast buffer and the corresponding and identical frame in the multicast buffer. For this purpose, the minimum size of data required to effect a matching operation is defined as an Identification Quantum (IDQ). The IDQ represents the smallest amount of data required in order to be able to guarantee that a match between frames is unique. Selection of an IDQ type may be according to a list of choices, known to those skilled in the art. These include, but are not limited to: 1) a CRC or MD5 checksum, or other condensed representation, of the data contained within a single transport packet or within multiple packets, 2) a vector consisting of, but not limited to, one or more of the following fields: a transport packet continuity counter, a picture temporal reference, a picture type (I, P, B, etc.), an absolute stream offset from start, where the vector represents a unique frame start identifier, and 3) an in-stream marker bit or bits, or a set of the same (this is possible if the server is able to manipulate the contents of the multicast buffer).

One consequence of buffering the multicast frames and switching to the multicast buffer once duplicate frames arrive is that the timeline of the displayed digital video content is permanently time shifted by the interval that resulted from the first channel change. This delay can be expected to be on the order of from zero to the maximum GOP size (e.g., 1-2 seconds). The above-described technique is especially applicable to clients that are capable of concurrently receiving two different streams and to cases in which adequate bandwidth headroom is temporarily available (e.g., fiber or dual RF/IP path).

The processor 130, 150 within the channel change server 108 and client 112 may include a multifunction processor and/or an application specific processor that is operationally connected to the memory 132, 152. The processor performs functions, such as executing software code, which are well-known in the field. The memory within the channel change server and the client may include circuits for storing processor-executable instructions, for buffering digital video content, and for storing data structures. Although the processor and memory are depicted as separate functional units, in some instances, the processor and memory are partially or fully integrated onto the same device.

With reference to FIG. 3, the buffer controller 136, channel change request detector 138, channel change request handler 140, and multicast return controller 142 may be embodied as processor-executable instructions that are stored on processor-accessible memory media. Likewise, With reference to FIG. 4, the buffer controller 156, channel change requestor 158, multicast return controller 162, and playout controller 164 may be embodied as processor-executable instructions that are stored on processor-accessible memory media. Additionally, although the above-identified functional elements are depicted as separate elements in FIGS. 3 and 4, the elements can be integrated with each other or stored in fragments throughout the server system 104, distribution network 110, and/or clients 112. Processor-executable instructions generally include programs, protocols, data structures, routines, objects, and interfaces that can perform and/or enable certain useful functions.

The above-described techniques for servicing channel change requests can be applied to any type of distribution network that is able to distribute digital video content via multicasting and unicasting. The return to multicasting can be a one-sided operation that is accomplished entirely by the server system 104 and/or the client 112 or it can be a two-sided operation that involves communications between the server system and the corresponding client. The server system depicted in FIGS. 1A-1F can be a single server or a combination of servers. If the server system is a combination of servers, the servers may be co-located or distributed across a network.

In FIGS. 1A-1F, the stream server 106 provides the multicast streams into the distribution network 110. In another embodiment, multicast streaming bypasses the stream server. The above-described technique of switching from providing digital video content to a client 112 via multicasting 114 to providing digital video content to the client via unicasting 118 until a pre-established condition is met is applicable whether the stream server provides the multicast streams into the distribution network or whether multicast streaming bypasses the stream server.

Figure 12:
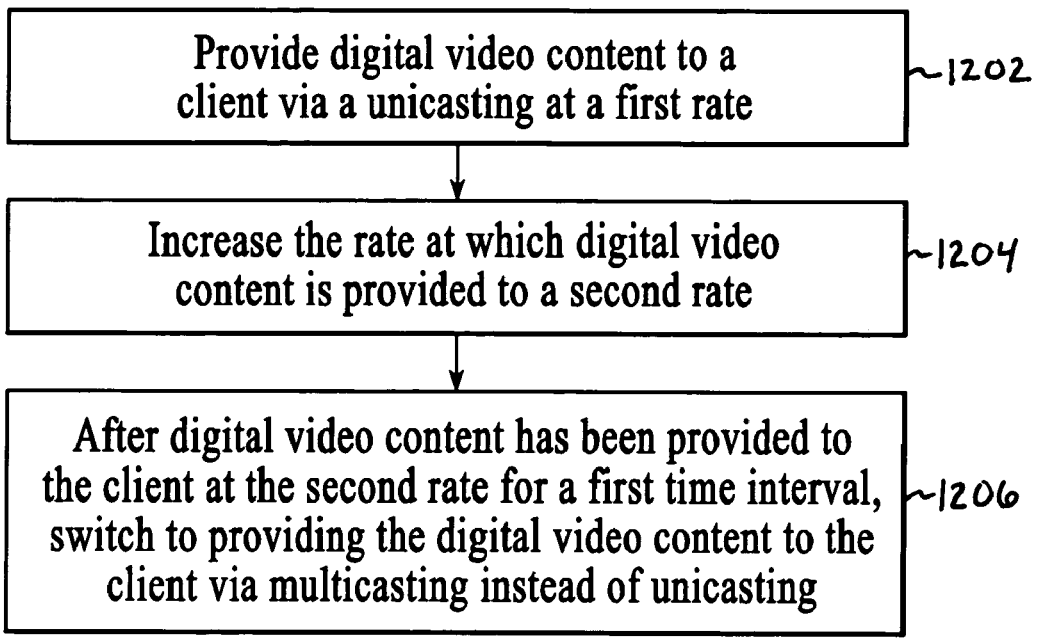
FIG. 12 is a process flow diagram of a method for servicing a channel change request in a digital video network in accordance with an embodiment of the invention.

FIG. 12 is a process flow diagram of a method for servicing a channel change request in a digital video network in accordance with an embodiment of the invention. At block 1202, digital video content is provided to a client via unicasting at a first rate. At block 1204, the rate at which digital video content is provided is increased to a second rate. At block 1206, after digital video content has been provided to the client at the second rate for a first time interval, a switch is made to providing the digital video content to the client via multicasting instead of unicasting.

Figure 13:
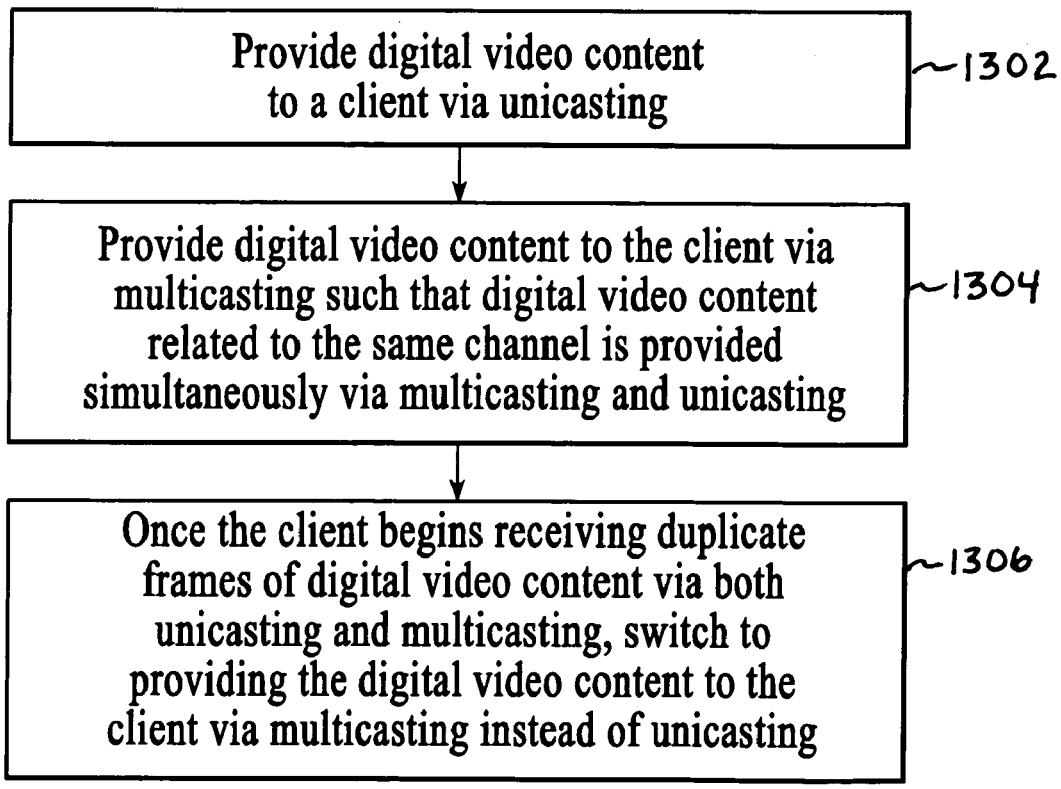
FIG. 13 is a process flow diagram of another method for servicing a channel change request in a digital video network in accordance with another embodiment of the invention.

FIG. 13 is a process flow diagram of another method for servicing a channel change request in a digital video network in accordance with another embodiment of the invention. At block 1302, digital video content is provided to a client via unicasting. At block 1304, digital video content is provided to the client via multicasting such that digital video content related to the same channel is provided simultaneously via multicasting and unicasting. At block 1306, once the client begins receiving duplicate frames of digital video content via both unicasting and multicasting, a switch is made to providing the digital video content to the client via multicasting instead of unicasting.

Although the stream server 106 is depicted as a single entity for description purposes, the stream server may be implemented as a single server or multiple servers that act collectively to stream digital video content to the clients.

Although specific embodiments of the invention have been described and illustrated, the invention is not to be limited to the specific forms or arrangements of parts as described and illustrated herein. The invention is limited only by the claims.

What is claimed is:

1. A method for switching a client from displaying digital video content provided via unicasting to displaying digital video content provided via multicasting, the method comprising:
   providing digital video content to a client via unicasting;
   providing digital video content to the client via multicasting such that digital video content related to the same channel is provided to the client simultaneously via multicasting and unicasting; and
   once the client begins receiving duplicate frames of digital video content via both unicasting and multicasting, switching to providing the digital video content to the client via multicasting instead of unicasting;
   further comprising servicing channel change requests in a digital video network that distributes digital video content to clients via multicasting and unicasting, the method comprising:
   providing digital video content to the client via multicasting, the digital video content being related to a first channel;
   detecting a channel change request related to the client, the channel change request requesting a change to a second channel;
   providing digital video content related to the second channel to the client via unicasting in response to the channel change request; and
   continuing to provide digital video content related to the second channel to the client via unicasting until a pre-established condition is met, wherein continuing to provide digital video content related to the second channel to the client via unicasting until a pre-established condition is met involves unicasting multiple frames of the digital video content related to the second channel to the client.

2. The method of claim 1 further comprising terminating the unicasting of digital video content to the client in response to the client receiving duplicate frames of digital video content.

3. The method of claim 1 further including determining whether the digital video content provided via multicasting includes a duplicate frame of the digital video content provided via unicasting.

4. The method of claim 1 further comprising establishing a multicast buffer for buffering frames received via multicasting.

5. The method of claim 4 further comprising playing digital video content out of the multicast buffer after the multicast buffer receives a frame of digital video content that is a duplicate of a frame received via unicasting.

6. The method of claim 1 further comprising switching to providing digital video content related to the second channel to the client via multicasting after the pre-established condition is met.

7. A system for switching a client from displaying digital video content provided via unicasting to displaying digital video content provided via multicasting, the system comprising:
   a processor and memory, configured to:
   provide digital video content to a client via unicasting;
   provide digital video content to the client via multicasting such that digital video content related to the same channel is provided to the client simultaneously via multicasting and unicasting; and
   once the client begins receiving duplicate frames of digital video content via both unicasting and multicasting, switch to providing the digital video content to the client via multicasting instead of unicasting;
   provide digital video content to a client via multicasting, the digital video content being related to a first channel;
   detect a channel change request related to the client, the channel change request requesting a change to a second channel;
   provide digital video content related to the second channel to the client via unicasting in response to the channel change request; and
   continue to provide digital video content related to the second channel to the client via unicasting until a pre-established condition is met, wherein continuing to provide digital video content related to the second channel to the client via unicasting until a pre-established condition is met involves unicasting multiple frames of the digital video content related to the second channel to the client.

8. The system of claim 7 wherein the multicast return controller is further configured to terminate the unicasting of digital video content to the client in response to the client receiving duplicate frames of digital video content.

9. The system of claim 7 wherein the multicast return controller is further configured to determine whether the digital video content provided via multicasting includes a duplicate frame of the digital video content provided via unicasting.

10. The system of claim 7 wherein the multicast return controller is further configured to establish a multicast buffer for buffering frames received via multicasting.

11. The system of claim 10 further comprising playing digital video content out of the multicast buffer after the multicast buffer receives a frame of digital video content that is a duplicate of a frame received via unicasting.

12. The system of claim 7 further comprising means for switching to providing digital video content related to the second channel to the client via multicasting after the pre-established condition is met.

13. A method for switching a client from displaying digital video content provided via unicasting to displaying digital video content provided via multicasting, the method comprising:
   receiving digital video content via unicasting;
   playing out the digital video content that is received via unicasting;
   receiving digital video content via multicasting such that digital video content related to the same channel is received simultaneously via unicasting and multicasting;
   buffering the digital video content received via multicasting; and
   once duplicate frames of digital video content are received via both unicasting and multicasting, switching to playing out the buffered digital video content received via multicasting instead of the digital video content received via unicasting;
   further comprising servicing channel change requests in a digital video network that distributes digital video content to clients via multicasting and unicasting, the method comprising:
   providing digital video content to the client via multicasting, the digital video content being related to a first channel;
   detecting a channel change request related to the client, the channel change request requesting a change to a second channel;
   providing digital video content related to the second channel to the client via unicasting in response to the channel change request; and
   continuing to provide digital video content related to the second channel to the client via unicasting until a pre-established condition is met, wherein continuing to provide digital video content related to the second channel to the client via unicasting until a pre-established condition is met involves unicasting multiple frames of the digital video content related to the second channel to the client.

14. The method of claim 13 further comprising terminating the unicasting of digital video content to the client in response to the client receiving duplicate frames of digital video content.

15. The method of claim 13 further including determining whether the digital video content received via multicasting includes a duplicate frame of the digital video content received via unicasting.

16. The method of claim 13 further comprising establishing a multicast buffer for buffering frames received via multicasting.

17. The method of claim 16 further comprising playing digital video content out of the multicast buffer after the multicast buffer receives a frame of digital video content that is a duplicate of a frame received via unicasting.

18. The method of claim 13 further comprising switching to providing digital video content related to the second channel to the client via multicasting after the pre-established condition is met.

19. The method of claim 13 further comprising:
   establishing a unicast buffer at the client for buffering frames received at the client via unicasting;
   establishing a multicast buffer at the client for buffering frames received at the client via multicasting;
   determining whether the buffered digital video content received at the client via multicasting includes a duplicate frame of the digital video content received at the client via unicasting; and
   wherein switching to playing out the buffered digital video content received via multicasting instead of the digital video content received via unicasting comprises playing out digital video content from the multicast buffer instead of from the unicast buffer.

20. The method of claim 19 wherein determining whether the buffered digital video content received at the client via multicasting includes a duplicate frame of the digital video content received at the client via unicasting comprises making a unique identification between a frame in the unicast buffer and the corresponding and identical frame in the multicast buffer.

* * * * *